US012657863B2

(12) United States Patent　　　(10) Patent No.: US 12,657,863 B2
　　Bhatt et al.　　　　　　　　　(45) Date of Patent:　　Jun. 16, 2026

(54) SYSTEM AND METHOD FOR FEWER OR NO NON-PARTICIPANT FRAMING AND TRACKING

(71) Applicant: Hewlett-Packard Development Company, L.P., Spring, TX (US)

(72) Inventors: Rajen B. Bhatt, McDonald, PA (US); Raghavendra Balavalikar Krishnamurthy, Austin, TX (US); Poojan Saimex Patel, Phoenix, AZ (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 417 days.

(21) Appl. No.: 18/295,953

(22) Filed: Apr. 5, 2023

(65) Prior Publication Data

US 2024/0338924 A1　　Oct. 10, 2024

(51) Int. Cl.
　　　*G06V 10/26*　　　　(2022.01)
　　　*G06V 20/40*　　　　(2022.01)
　　　*G06V 40/10*　　　　(2022.01)
　　　*G06V 40/40*　　　　(2022.01)
(52) U.S. Cl.
　　　CPC ............ *G06V 10/273* (2022.01); *G06V 20/46* (2022.01); *G06V 40/10* (2022.01); *G06V 40/40* (2022.01)
(58) Field of Classification Search
　　　CPC ...... G06V 10/273; G06V 20/46; G06V 40/10; G06V 40/40; G06V 40/161
　　　USPC ......... 348/14.12, 14.03, 14.02, 14.08, 14.09, 348/14.1, 14.77, 14.78
　　　See application file for complete search history.

(56) References Cited

U.S. PATENT DOCUMENTS

| | | | |
|---|---|---|---|
| 10,991,154 B1 * | 4/2021 | Li | G06N 3/047 |
| 2018/0276488 A1 * | 9/2018 | Yoo | G06V 40/169 |
| 2023/0153963 A1 * | 5/2023 | Zhang | H04N 7/147 348/14.01 |
| 2024/0020800 A1 * | 1/2024 | Springer | G06V 40/172 |
| 2024/0289984 A1 * | 8/2024 | Therkelsen | G06T 7/73 |

FOREIGN PATENT DOCUMENTS

| | | | | |
|---|---|---|---|---|
| CN | 116524554 A | * | 8/2023 | G06V 20/52 |
| JP | 2017028375 A | * | 2/2017 | H04N 19/107 |

* cited by examiner

*Primary Examiner* — Duc Nguyen
*Assistant Examiner* — Carissa A Jones
(74) *Attorney, Agent, or Firm* — Quarles & Brady LLP

(57)　　　　ABSTRACT

Systems and methods are provided for implementing fewer or no nonparticipant framing. One method can include obtaining, by an electronic processor, an image of a video stream of images. The method can also include detecting, by the electronic processor, a plurality of potential participants in the image for framing. The method can also include identifying, by the electronic processor, a first potential participant of the plurality of potential participants in the image as a nonparticipant. The method can also include discarding, by the electronic processor, the first potential participant from the plurality of potential participants in the image for framing in response to identifying the first potential participant as the nonparticipant. The method can also include providing, by the electronic processor, a frame for the image where the frame frames a second potential participant from the plurality of potential participants and being smaller than the image.

22 Claims, 12 Drawing Sheets

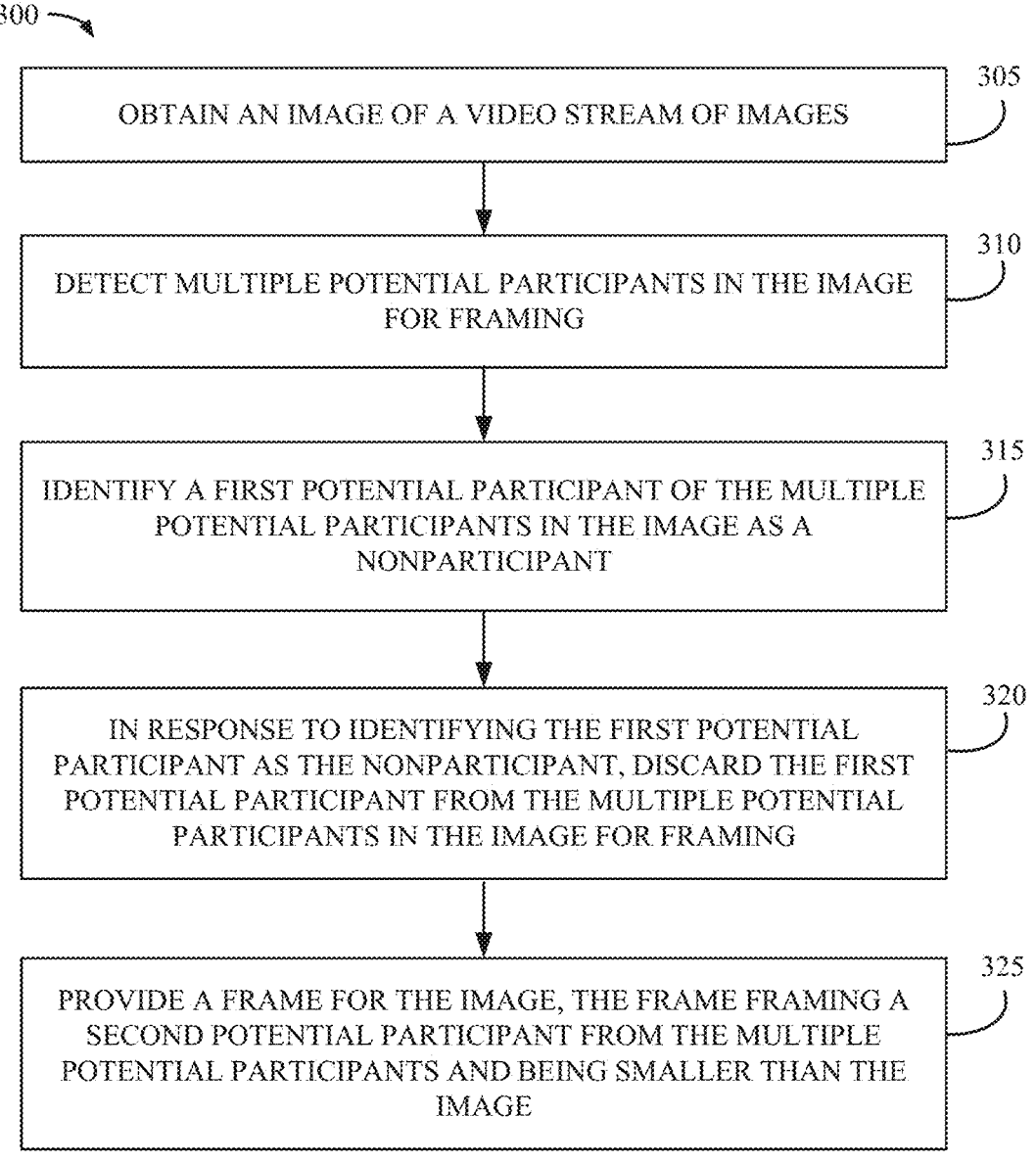

300

OBTAIN AN IMAGE OF A VIDEO STREAM OF IMAGES — 305

DETECT MULTIPLE POTENTIAL PARTICIPANTS IN THE IMAGE FOR FRAMING — 310

IDENTIFY A FIRST POTENTIAL PARTICIPANT OF THE MULTIPLE POTENTIAL PARTICIPANTS IN THE IMAGE AS A NONPARTICIPANT — 315

IN RESPONSE TO IDENTIFYING THE FIRST POTENTIAL PARTICIPANT AS THE NONPARTICIPANT, DISCARD THE FIRST POTENTIAL PARTICIPANT FROM THE MULTIPLE POTENTIAL PARTICIPANTS IN THE IMAGE FOR FRAMING — 320

PROVIDE A FRAME FOR THE IMAGE, THE FRAME FRAMING A SECOND POTENTIAL PARTICIPANT FROM THE MULTIPLE POTENTIAL PARTICIPANTS AND BEING SMALLER THAN THE IMAGE — 325

SYSTEM AND METHOD FOR FEWER OR NO NON-PARTICIPANT FRAMING AND TRACKING

BACKGROUND

Video conferencing technology enables users to communicate with one another from remote locations. For example, each participant in a video conference may include a computing device (e.g., a desktop computer, laptop, tablet, embedded computer, etc.) with an imaging device that generates an audio and video stream that conveys the participant's voice and appearance to other participants via computing devices communicatively coupled to a communication network, and with a display that outputs video from video streams of other participants. In some scenarios, the imaging device is equipped in a conference room to capture multiple participants for other remote participants.

The discussion above is merely provided for general background information and is not intended to be used as an aid in determining the scope of the claimed subject matter.

BRIEF DESCRIPTION OF THE DRAWINGS

The following drawings are provided to help illustrate various features of examples of the disclosure and are not intended to limit the scope of the disclosure or exclude alternative implementations.

FIG. 3 is a flowchart illustrating a method for implementing fewer or no non-participant framing according to some examples.

FIG. 4C shows a first speaker in a speaker frame, FIG. 4D shows another speaker joining the speaker frame, and FIG. 4E shows another speaker in the speaker frame.

DETAILED DESCRIPTION OF THE PRESENT DISCLOSURE

Figure 1:
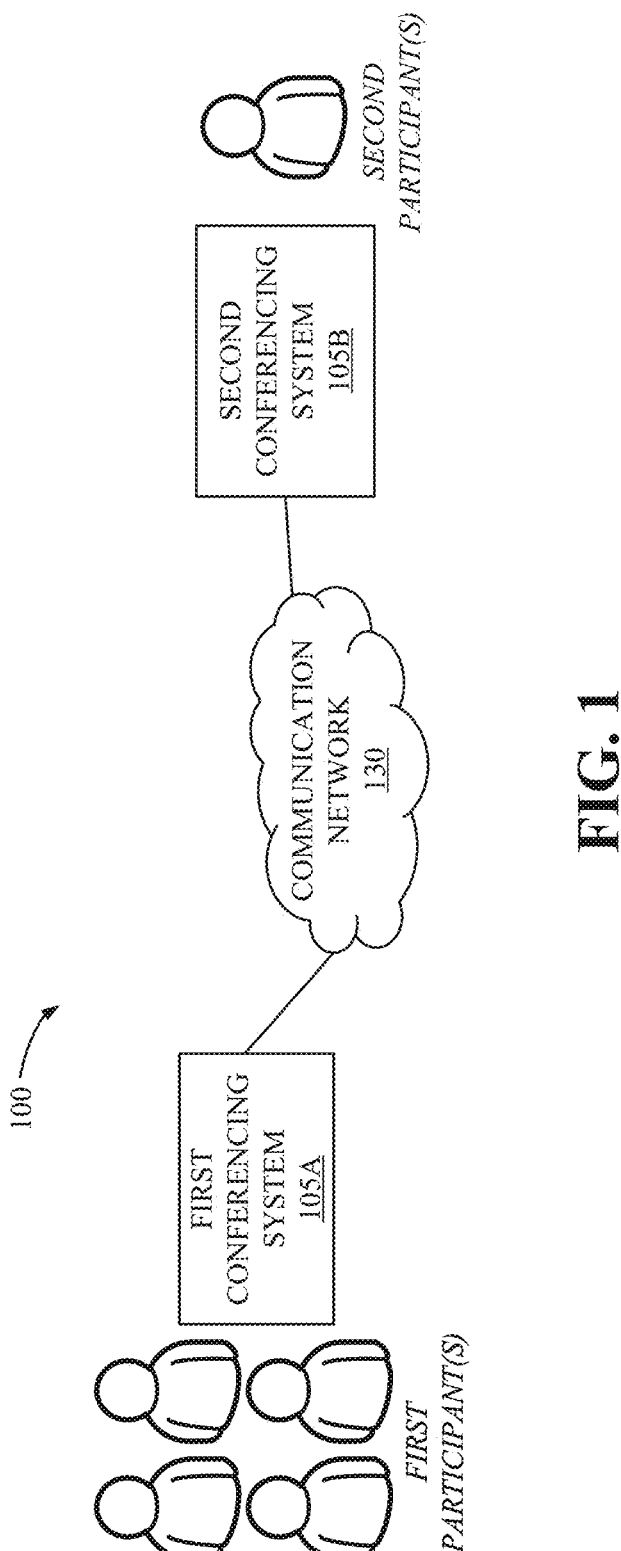
FIG. 1 schematically illustrates a system for implementing communication between one or more user systems according to some examples.

The disclosed technology is not limited in its application to the details of construction and the arrangement of components set forth in the following description or illustrated in the following drawings. Other examples of the disclosed technology are possible and examples described and/or illustrated here are capable of being practiced or of being carried out in various ways.

A plurality of hardware and software-based devices, as well as a plurality of different structural components can be used to implement the disclosed technology. In addition, examples of the disclosed technology can include hardware, software, and electronic components or modules that, for purposes of discussion, can be illustrated and described as if the majority of the components were implemented solely in hardware. However, in at least one example, the electronic based aspects of the disclosed technology can be implemented in software (for example, stored on non-transitory computer-readable medium) executable by one or more processors. Although certain drawings illustrate hardware and software located within particular devices, these depictions are for illustrative purposes only. In some examples, the illustrated components can be combined or divided into separate software, firmware, hardware, or combinations thereof. As one example, instead of being located within and performed by a single electronic processor, logic and processing can be distributed among multiple electronic processors. Regardless of how they are combined or divided, hardware and software components can be located on the same computing device or can be distributed among different computing devices connected by one or more networks or other suitable communication links.

As described above, video conferencing technology enables users to communicate with one another from remote locations. For example, each participant in a video conference may include a computing device (e.g., a desktop computer, laptop, tablet, embedded computer, etc.) with an imaging device that may include an embedded computing device and generates an audio and video stream that conveys the participant's voice and appearance to other participants via computing devices communicatively coupled to a communication network and with a display that outputs video from video streams of other participants. In some scenarios, the imaging device is equipped in a conference room to capture multiple participants for other participants. However, the imaging device or a computing device merely conveys, to other participants, a video stream of images that includes the entire conference room including an unnecessary space for the meeting and shows multiple participants with small sizes due to the unnecessary space in the video stream of images. In some examples, the imaging device or the computing device can frame participants in a frame to reduce the unnecessary space of the conference room by identifying and detecting each participant thereby focusing on the participants for improved experiences. In some examples, framing refers to a portion of a full image of a scene being captured by the imaging device and smaller than the full image. Framing coordinates for the portion may be defined based on location of people and other objects in the scene according to some examples. In some examples, tracking refers to constantly following people and objects in the scene to maintain the state of the frame according to some examples. Unless otherwise noted, framing and tracking are jointly referred to as framing or used alternatively herein. However, the imaging device or the computing device can identify some non-participants (e.g., person, human image, etc.) as participants of the video conference and include the non-participants in the frame. For example, the non-participant can be a human image shown in a display (e.g., television, monitor, screen, etc.), a human image reflected on a reflective surface, glossy surface, or a person outside the conference room. Thus, identifying and/or rejecting the nonparticipant(s) in a frame for a video stream of images is in need.

Accordingly, in some examples, the technology disclosed herein can provide framing and/or tracking experiences with fewer or no non-participants. In particular, the technology described herein can identify a nonparticipant by 1) identifying a boundary of a display in the video where the boundary of the display entirely includes the non-participant, 2) identifying the liveness (e.g., the variance of the Laplacian method, focus measure, blurriness, etc.) of the non-participant wherein the liveness of the non-participant is below a predetermined liveness threshold, or 3) identifying the non-participant included in the discarding area where a wall location splits a field of view of the camera in the video into a discarding area and an including area. Then, the technology can discard the identified nonparticipant for framing and/or tracking. Thus, the technology described herein can accurately identify participants of the video conference in a frame to be provided to other participants and save the time, energy consumption, and computing resources for processing and/or tracking unnecessary participants.

In some examples, the technology disclosed herein provides a method for creating fewer or no non-participant framing. The method can include obtaining an image of a video stream of images. The method can include detecting multiple potential participants in the image for framing. The method can include identifying a first potential participant of the multiple potential participants in the image as a nonparticipant. The method can include in response to identifying the first potential participant as the nonparticipant, discarding the first potential participant from the multiple potential participants in the image for framing. The method can include providing a frame for the image. The frame frames a second potential participant from the multiple potential participants and is smaller than the image.

In some examples, the technology disclosed herein provides a system or an apparatus for creating fewer or no non-participant framing. The system or apparatus can include an imaging device, a memory, and an electronic processor coupled to the memory. The electronic processor can be configured to obtain an image of a video stream of images. The electronic processor can be configured to detect multiple potential participants in the image for framing. The electronic processor can be configured to identify a first potential participant of the multiple potential participants in the image as a nonparticipant. The electronic processor can be configured to discard the first potential participant from the multiple potential participants in the image for framing in response to identifying the first potential participant as the nonparticipant. The electronic processor can be configured to provide a frame for the image. The frame frames a second potential participant from the multiple potential participants and is smaller than the image.

In some examples, the technology disclosed herein provides a non-transitory computer-readable medium storing instructions that, when executed by an electronic processor, perform a set of functions for creating fewer or no non-participant framing. The set of functions can include obtaining an image of a video stream of images. The set of functions can include detecting multiple potential participants in the image for framing. The set of functions can include identifying a first potential participant of the multiple potential participants in the image as a nonparticipant. The set of functions can include discard the first potential participant from the multiple potential participants in the image for framing in response to identifying the first potential participant as the nonparticipant. The set of functions can include providing a frame for the image. The frame frames a second potential participant from the multiple potential participants and is smaller than the image.

FIG. 1 illustrates a system 100 for implementing communication between one or more user systems, according to some examples. For example, the system 100 can enable a video conference between one or more users as participants in the video conference. In the example illustrated in FIG. 1, the system 100 includes a first conferencing system 105A and a second conferencing system 105B (collectively referred to herein as "the conferencing systems 105" and generically referred to as "the conferencing system 105"). The system 100 can include additional, fewer, or different conferencing systems than illustrated in FIG. 1 in various configurations. Each user system 105 can be associated with one or more users. For example, the first conferencing system 105A can be associated with multiple first participants (e.g., in a conference room or any suitable place for a video conference) and the second conferencing system 105B can be associated with one or more second participants.

The first conferencing system 105A and the second conferencing system 105B can communicate over one or more wired or wireless communication networks 130. Portions of the communication networks 130 can include a Wi-Fi network (which can include one or more wireless routers, one or more switches, etc.), a peer-to-peer network (e.g., a Bluetooth™ network), a cellular network (e.g., a 3G network, a 4G network, a 5G network, etc., complying with any suitable standard, such as CDMA, GSM, LTE, LTE Advanced, NR, etc.), a wired network, etc. Alternatively, or in addition, in some examples, two or more components of the system 100 can communicate directly as compared to through the communication network 130. Alternatively, or in addition, in some examples, two or more components of the system 100 can communicate through one or more intermediary devices not illustrated in FIG. 1.

Figure 2:
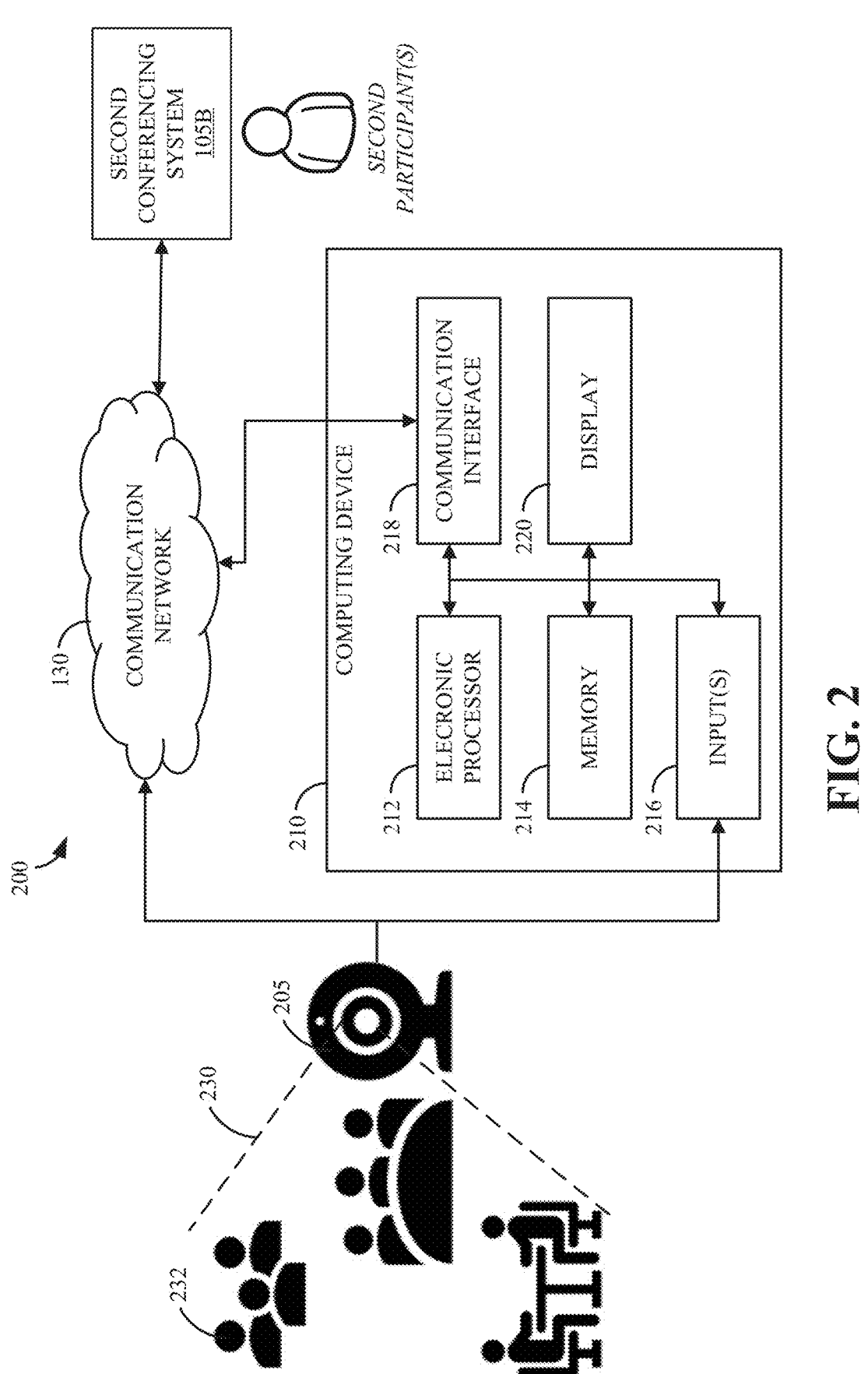
FIG. 2 schematically illustrates a system of implementing fewer or no nonparticipant framing according to some examples.

FIG. 2 illustrates a system 200 for implementing fewer or no nonparticipant framing, according to some examples. The system 200 of FIG. 2 can be an example of the conferencing system(s) 105 of FIG. 1. As illustrated in the example of FIG. 2, the system 200 can include an imaging device and a computing device 210. In some examples, the system 200 can include fewer, additional, or different components in different configurations than illustrated in FIG. 2. For example, as illustrated, the system 200 includes one imaging device 205 and one computing device 210. However, in some examples, the system 200 can include fewer or additional imaging devices 205, computing devices 210, or a combination thereof. As another example, one or more components of the system 200 can be combined into a single device, divided among multiple devices, or a combination thereof. In some examples, the computing device 210 can be embedded or included in the imaging device 205 to process a still image and/or a video stream of images. In other examples, the computing device 210 can be a physically or logically separated device from the imaging device 205 and communicate with the imaging device 205 over one or more wired or wireless communication networks 130. In some examples, the computing device 210 and/or the imaging device 205 can be the first conferencing system 105A of FIG. 1.

The imaging device 205 can electronically capture a visual image (as an image data signal or data stream) in the field of view 230 of the imaging device 205. A visual image can include, e.g., a still image, a moving-image, a video stream, other data associated with providing a visual output, and the like. The imaging device 205 can include one or more cameras, such as, e.g., a webcam, a conference room camera, an image sensor, or the like. For example, the imaging device 205 can generate the visual image associated with multiple participants 232 in the field of view of the imaging device 205.

In some examples, the computing device 210 can obtain the visual image or an image of a video stream of the imaging device 205 via an input 216 of the computing device 210. In other words, the imaging device 205 may be incorporated into the input 216 and, thus, the computing device 210 and the imaging device 205 are combined (e.g., as a single device in a shared housing). Thus, in such examples, the imaging device 205 may be referred to as including the computing device 210 (or the components thereof), and the imaging device 205 can capture, record, and process the visual image and/or the image of the video stream of images. In other examples, the computing device 210 can communicate with the imaging device 205 over one or more wired or wireless communication networks 130. For example, the imaging device 205 transmits the visual image and/or the image of the video stream of images to the computing device 210 over the communication networks 130 described in FIG. 1, and the computing device 210 obtains the visual image and/or the image of the video stream of images.

The computing device 210 can include, e.g., a desktop computer, a laptop computer, a tablet computer, an embedded computing device, a terminal, a smart telephone, a smart television, or another suitable computing device that interfaces with the imaging device 205 and other computing devices for other participants of the video conference. As described in greater detail herein, the computing device 210 can be used to process the obtained visual image or the image of the video stream of images and provide a frame including at least part of the visual image or the image of the video stream of images to the second conferencing system 105B for the second participant(s) of the video conference, and/or or other conferencing system joining the video conference.

As illustrated in FIG. 2, the computing device 210 includes an electronic processor 212, a memory 214, an input(s) 216, a communication interface 218, and a display 220. The electronic processor 212, the memory 214, the input(s) 216, the communication interface 218, and the display 220 can communicate wirelessly, over one or more communication lines or buses, or a combination thereof. The computing device 210 can include additional, different, or fewer components than those illustrated in FIG. 2 in various configurations. The computing device 210 can perform additional functionality other than the functionality described herein. Also, the functionality (or a portion thereof) described herein as being performed by the computing device 210 can be performed by another component (e.g., the imaging device 205, a remote server or computing device, another computing device, or a combination thereof), distributed among multiple computing devices (e.g., as part of a cloud service or cloud-computing environment), combined with another component (e.g., the imaging device 205, a remote server or computing device, another computing device, or a combination thereof), or a combination thereof.

The communication interface 218 can include any suitable hardware, firmware, and/or software for communicating with the imaging device 205, the second conferencing system 105B, another device external or remote to the system 200, or a combination thereof over communication network 140 and/or any other suitable communication networks. For example, communication interface 218 can include one or more transceivers, one or more communication chips and/or chip sets, etc. In a more particular example, the communication interface 218 can include hardware, firmware and/or software that can be used to establish a Wi-Fi connection, a Bluetooth™ connection, a cellular connection, an Ethernet connection, etc.

In some embodiments, the electronic processor 212 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), or another suitable electronic device for processing data. The electronic processor 212 coupled to the memory 214 is configured to retrieve instructions and data from the memory 214 and execute the instructions.

In some examples, the memory 214 can include any suitable storage device or devices that can be used to store suitable data (e.g., the visual image, the visual stream of images, a wall location, etc.) and instructions that can be used, for example, by the electronic processor 212 to obtain an image of a video stream of images, detect multiple potential participants in the image for framing, identify a first potential participant of the multiple potential participants in the image as a nonparticipant, discard the first potential participant from the multiple potential participants in the image for framing in response to identifying the first potential participant as the nonparticipant, and/or provide a frame for the image. The memory 214 can include any suitable volatile memory, non-volatile memory, storage, or any suitable combination thereof. For example, memory 214 can include random access memory (RAM), read-only memory (ROM), electronically-erasable programmable read-only memory (EEPROM), one or more flash drives, one or more hard disks, one or more solid state drives, one or more optical drives, etc. In some embodiments, the memory 214 can have encoded thereon a computer program for identifying a first potential participant as a nonparticipant, an image of a video stream, discarding the first potential participant in the image for framing, providing a frame including a second potential participant for the image, etc. For example, in such embodiments, the processor 212 can execute at least a portion of the computer program to perform one or more data processing tasks described herein transmit/receive information via the communications system(s) 218, etc. As another example, the processor 212 can execute at least a portion of process 300 described below in connection with FIG. 3.

In some examples, the computing device 210 can further include a display 220 and/or one or more inputs 216. In some embodiments, the display 220 can include any suitable display devices, such as a computer monitor, a touchscreen, a television, an infotainment screen, etc. to display the frame including one or more participants captured by the imaging device 205 and other video stream(s) for other participant(s)

of the video conference provided via the communication network 130. In some examples, the input(s) 216 can include an input interface with the imaging device 205. In further examples, the input(s) 216 can further include any suitable input devices and/or sensors that can be used to receive user input, such as a keyboard, a mouse, a touchscreen, a microphone, etc.

FIG. 3 is a flowchart illustrating a method 300 for implementing fewer or no non-participant framing according to some examples. The method 300 is described as being performed by the computing device 210 and, in particular, the electronic processor 212. However, as noted above, the functionality described with respect to the method 300 can be performed by other devices, such as the imaging device 205, a remote server or computing device, another component of the system 200, or a combination thereof, or distributed among multiple devices, such as multiple servers included in a cloud service (e.g., a web-based service executing software or applications associated with a communication platform or application). As described below, a particular implementation can omit some or all illustrated features/steps, may be implemented in some embodiments in a different order, and may not require some illustrated features to implement all embodiments.

In block 305 of the method 300, the electronic processor 212 obtains an image of a video stream of images. In some examples, the image of the video stream of images can include a still image, a moving image, a sequence of images, a frame, or multiple frames of the video stream captured by an imaging device 205. In further examples, the image of the video stream of images shows a field of view of the imaging device 205. In some examples, the electronic processor 212 can obtain the video stream of images for a video conference to transmit at least a part of the video stream to other communicatively coupled video conferencing system(s) for other remote participant(s) in the video conference. In some examples, the image can include one or more participants in a conference room. In some examples, the image can include additional items as well, for example, furniture in the conference room, a reflective wall or surface, a wall, a display, persons, or objects in an area outside of the conference room, or the like.

In block 310 of the method 300, the electronic processor 212 detects multiple potential participants in the image for framing. In some examples, a potential participant can be a participant or a nonparticipant in a video conference. In some examples, the nonparticipant can be a human image in a display (e.g., television, monitor, screen, etc.), a reflected image of a person reflected on a reflective surface (e.g., glass or glass-like materials such as a television screen, a portrait, a reflective glossy white board, a glossy tabletop, a glossy white boarding wall, a glass wall, or any other suitable surface having the capacity to reflect light), or a human in a discarding area or not in an including area in the image (e.g., outside of the conference room or glass walls, outside of an intended area of a large conference room). In some examples, to detect the multiple potential participants, the electronic processor 212 can detect multiple human heads corresponding to the multiple potential participants and generate multiple bounding boxes corresponding to the multiple human heads. Each bounding box surrounds a head of the multiple heads for a respective potential participant. In some examples, the electronic processor 212 can further detect the display or a display bounding box of the display in the image. In further examples, the electronic processor 212 can identify the display being activated based on a histogram of pixels within the boundary of the display.

In block 315 of the method 300, the electronic processor 212 identifies a first potential participant of the multiple potential participants in the image as a nonparticipant. The electronic processor 212 can identify the first potential participant as a nonparticipant using various techniques including, for example identifying the first potential participant (1) as being a displayed person on an electronic display, (2) as being a reflection of a person, or (3) as being a person outside of a conference area. To identify the first potential participant as a displayed person on an electronic display, the electronic processor may identify a boundary of a display including or entirely including the first potential participant ("display nonparticipant"). To identify the first potential participant as a reflection of a person, the electronic processor may identify a liveness indication of the first potential participant being below a predetermined liveness threshold ("reflected nonparticipant"). To identify the first potential participant as being a person outside of a conference area, the electronic processor may identify the first potential participant as being included in a discarding area ("discarding area nonparticipant"). The identifications of the display nonparticipant, the reflected nonparticipant, and the discarding area nonparticipant are briefly described below, and then the identifications and discards of these nonparticipants are described in further detail below in connection with FIGS. 5A-5D, 6A-6D, and 7A-7E, respectively.

In some examples, for the identification of the display nonparticipant, the electronic processor 212 can identify the first potential participant in response to the identifying of the display being activated. In some examples for the identification of the display nonparticipant, the electronic processor 212 can identify the boundary of the display including or entirely including a first bounding box corresponding to the first potential participant. The first bounding box may refer to the bounding box that corresponds to or surrounds the head of the first potential participant, as discussed with respect to block 310. That is, the head of the first potential participant may be a first human head of the multiple human heads detected in block 310.

In some examples, for the identification of the reflected nonparticipant, the electronic processor 212 determines a liveness indication of the first potential participant. In some examples, to determine the liveness indication of the first potential participant, the electronic processor 212 converts the first potential participant (e.g., the first bounding box surrounding the head of the first potential participant) to a grey scale image, convolves the grey scale image with a predetermined kernel, and determines a variance based on the convolved grey scale image. In some examples, the liveness indication includes or is indicative of the variance. In some examples, the first potential participant is a reflected image of a potential participant of the multiple potential participants reflected on a reflective surface.

In some examples, for the identification of the discarding area nonparticipant, the electronic processor 212 splits the image into a discarding area and an including area based on a wall location in the image and identifies whether the first person is in the discarding area or the including area. In some examples, the electronic processor 212 can receive a user input being indicative of the wall location in the image. In other examples, the electronic processor 212 can identify the wall location in the image by detecting characteristics (e.g., variance, reflection, liveness, surface texture, location of frame(s), location of door(s), etc.) of the wall. In some examples, the electronic processor can convert a two-dimensional space of the image into an x-y coordinate plane from bird's eye view perspective (or top view perspective) where the x-y coordinate plane includes a plurality of x-y coordinates. In some examples, each x-y coordinate can indicate a distance from the imaging device 205. In some examples, the distance can include a first distance from the imaging device 205 on the x-axis (horizontal offset from the camera location) of the x-y coordinate plane and a second distance from the imaging device on the y-axis (depth dimension from the camera location) of the x-y coordinate plane. For example, although the image is a two-dimensional image, where three-dimensional world coordinates are mapped on a two-dimensional image plane with the depth information lost. The field of view captured by the imaging device 205 in the image shows a three-dimensional space (e.g., of a conference room) mapped on to two-dimensional image plane. The three-dimensional space represented in the image as two-dimensional pixels data structure can show the floor, the ceiling, and/or side walls of the conference room. In some examples, the x-y coordinate plane can include a plane of the top view (i.e., bird's eye view) of the field of view of the imaging device 205. In some examples, the origin (i.e., (0,0)) of the x-y coordinate plane can be the location of the imaging device 205. However, the origin of the x-y coordinate plane can be any other suitable location (e.g., each of four corners of the x-y coordinate plane, or any other suitable location in the x-y coordinate plane). In further examples, it should be appreciated that the x-y coordinate can indicate any other value or indication (e.g., absolute coordinate) to indicate a location in the x-y coordinate plane of the image. In some examples, to identify the first potential participant being included in the discarding area, the electronic processor 212 identifies a first x-y coordinate for the first potential participant where the first x-y coordinate is included in the discarding area defined by the multiple of x-y coordinates (i.e., wall location). In some examples, the wall location can include multiple x-y coordinates, which is a subset of all x-y coordinates of the x-y coordinate plane. For examples, an x-y coordinate can include a first distance from the imaging device 205 on the x-axis of the x-y coordinate plane and a second distance from the imaging device on the y-axis of the x-y coordinate plane. In some examples, multiple x-y coordinates for the wall location can be a line from a one edge (e.g., 0 distance on the x-axis, the farthest distance from the 0 distance on the x-axis, 0 distance on the y-axis, or the farthest distance from the 0 distance on the y-axis) of the x-y coordinate plane to the same edge or another edge of the x-y coordinate plane. In further examples, multiple x-y coordinates for the wall location can have any suitable shape (e.g., square, rectangle, triangle, circle, oval, rhombus, polygon, etc.) defining a discarding area.

Referring to FIG. 3, in block 320 of the method 300, the electronic processor 212 discards the first potential participant from the multiple potential participants in the image for framing in response to identifying the first potential participant as the nonparticipant. In some examples, to discard the first potential participant, the electronic processor 212 can stop tracking and/or processing the first potential participant for framing, can generate or store a determination not to include the first potential participant in a frame, can cease framing of the first potential participant (e.g., when previously framed and not recognized as a nonparticipant by the electronic processor 212), and/or can assign a nonparticipant label to the first potential participant (e.g., for use by the electronic processor 212 when framing for the video stream).

Referring to FIG. 3, in block 325 of the method 300, the electronic processor 212 provides a frame for the image where the frame frames a second potential participant from the multiple potential participants and is smaller than the image. Accordingly, in block 325, the frame includes a part of the image of the video stream of images that is smaller than the image, and the frame frames the second potential participant. In some examples, the frame includes a part of the image of the video stream of images where the part enlarges or zooms-in on the second potential participant of the video conference. The frame is further described below in connection with FIGS. 4A-4E.

In some examples, with reference to FIG. 2, the electronic processor 212 transmits the frame to the second conferencing system 105B for display to the second participant(s) (e.g., via the communication network 130). In some examples, the electronic processor 212 transmits the frame with the image. In such examples, the second conferencing system 105B may display the frame overlaid on the image, beside the image, or without the image. In some examples, the electronic processor 212 integrates the frame with the image to generate an integrated image, for example, by overlaying the frame on the image, and transmits the integrated image. In such examples, the second conferencing system 105B may display the integrated image.

In some examples, the electronic processor dynamically determines the frame in each image of the video stream of images due to possible movement of a participant. For example, the electronic processor 212 may execute the process 300 repeatedly, for example, once per image of the video stream of images or once per certain number of images of the video stream of images. Accordingly, the electronic processor 212 may continuously provide accurate framing (or dynamic framing) during a video conference that adapts as individuals enter into the conference room area, exit the conference room area, or move within the conference room area and that reduces or eliminates framing of nonparticipants (e.g., display nonparticipants, the reflected nonparticipants, and the discarding area nonparticipants).

The frame is further described below in connection with FIGS. 4A-4E. In some examples, the frame can include a composite frame including a panel corresponding to the second potential participant of the multiple potential participants and excluding the first potential participant. For example, the composite frame can include multiple panels corresponding to multiple potential participants. The electronic processor 212 can magnify each participant of multiple potential participants in the image to be shown in a panel and combine the panels to be the composite frame. In the examples, the electronic processor 212 does not include the first potential participant as a nonparticipant in the composite frame. In further examples, the frame can include a group frame. In some examples, the electronic processor 212 can generate the group frame including the second potential participant and/or one or more other potential participants of the multiple potential participants. The electronic processor 212 does not process the first potential participant to be included in the group frame. In the examples, the group frame can magnify a part of the image to include the second potential participant. In the examples, the first potential participant might be included in the group frame if the first potential participant is placed between two other potential participants included in the group frame. However, the electronic processor 212 does not process the first potential participant to be included in the group frame. Thus, the method 300 can save time, energy consumption, and/or computing resources for processing and/or tracking unnecessary participants.

Figure 4A:
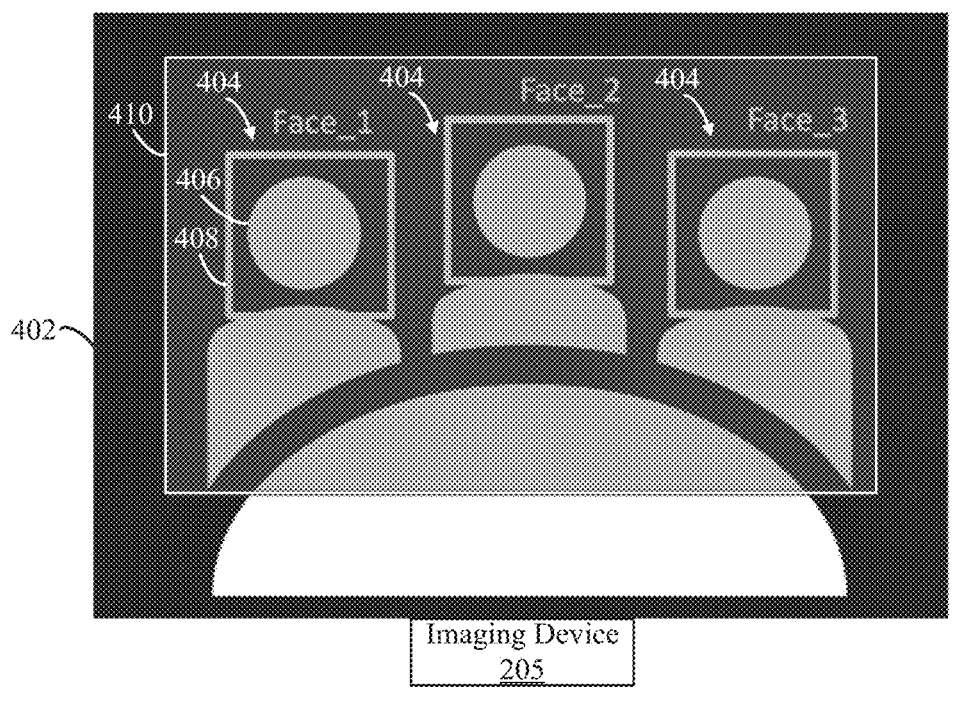
FIG. 4A illustrates a field of view of an imaging device and a group frame.

FIGS. 4A-4E illustrate example framing techniques to generate a frame framing one or more participants in an image (i.e., one or more images) of a video stream of images where the frame is smaller than the image. The frame can be a group frame in FIG. 4A or a composite frame (e.g., a people frame in FIG. 4B or a speaker frame in FIGS. 4C-4E). For example, FIG. 4A illustrates a field of view of the imaging device 205 capturing multiple potential participants. Based on the field of view of the imaging device 205, the electronic processor 212 obtains an image 402 (i.e., one or more images) of a video stream of images including one or more participants 404 from the imaging device 205. In some examples, the electronic processor 212 can detect a participant 404 (i.e., one or more participants 404) by detecting a corresponding head 406 of each participant (e.g., based on the shapes and/or locations of two eyes, nose, mouth, hair, chin, or any other characteristics of the head). In the examples, the electronic processor 212 can generate a bounding box 408 surrounding a head 406 of the participant 404 to correspond to the head 406. In some examples, the bounding box 408 can include information about the head 406 (e.g., the height, the width, the location of the head 406, etc.). In some examples, the electronic processor 212 can track the movement of the head 406 using the bounding box 408. It should be appreciated that the electronic processor 212 can detect the participant 404 by detecting other parts of the participant 404 with or without the corresponding head 406. Further, the bounding box 408 is not limited to a box surrounding the head 406. The bounding box 408 can be a box surrounding the entire participant or other parts of the participant 404. Additionally, although the bounding box 408 is illustrated as a square, the bounding box 408 may be a rectangle, another polygon, or another geometrical shape providing a boundary.

FIG. 4A also illustrates a group frame 410 framing multiple participants in the image of the video stream of images. The group framing focuses on the group of participants 404. For example, the electronic processor 212 (e.g., using underlying artificial intelligence algorithms) can detect each head 406 and/or participant in a conference room and zoom-in on the group of participants 404 (e.g., by applying rule of thirds and other framing a group logic). In some examples, the group frame 410 is a part of the image of the video stream of images to include the group of participants 404 and is smaller than the size of the image of the video stream of images by excluding less important portions (e.g., of the ceiling, floor, table, or another part of the image without including any participant) of the image. In some examples, the electronic processor 212 can dynamically determine the group frame 410 by detecting the group of participants 404 in each image in the video stream of images. For example, a participant 404 can move in the conference room. Then, the electronic processor 212 tracks the movement of the participant and redetermines the group frame 410 because the movement of the participant changes the size or order of the group frame 410 to include the moved participant. In further examples, the electronic processor 212 can display the group frame 410 or transmit the group frame 410 to other conferencing system(s) for other participant(s) to display the group of participants in the other conferencing system(s). Thus, the other participants of the video conference can see the group of participants more clearly using the group frame 410.

Figure 4B:
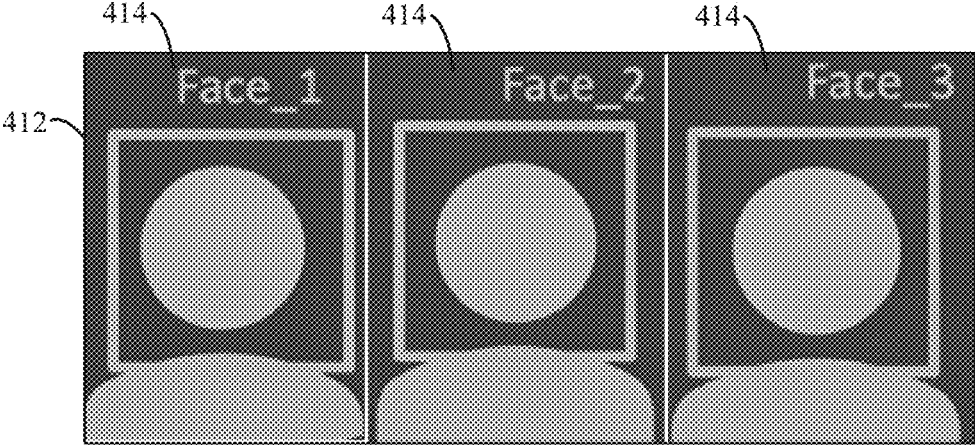
FIG. 4B illustrates a people frame.

FIG. 4B illustrates a people frame 412 framing one or more participants in the image of the video stream of images. The people framing provides each meeting participant an individual panel to form a composite frame to send for far end viewing (e.g., at the second conferencing system 105B). In some examples, the people frame 412 is a composite frame including one or more panels 414 corresponding to the one or more participants. Each panel focuses, crops around, and/or zooms on a participant. In some examples, each panel displays a head, an upper body, and/or the whole part of the participant. In some examples, the electronic processor 212 can dynamically determine the people frame 412 by detecting each participant 404 in each image in the video stream of images. For example, a participant 404 can move in the conference room. Then, the electronic processor 212 tracks the movement of the participant and redetermine each panel corresponding to a participant and the people frame 410 including all panels because the movement of the participant changes the location of the panel to include the moved participant. The electronic processor 212 can display the people frame 412 or transmit the people frame 412 to other conferencing system(s) for other participant(s) to display the group of participants in the other conferencing system(s).

Figure 4C:
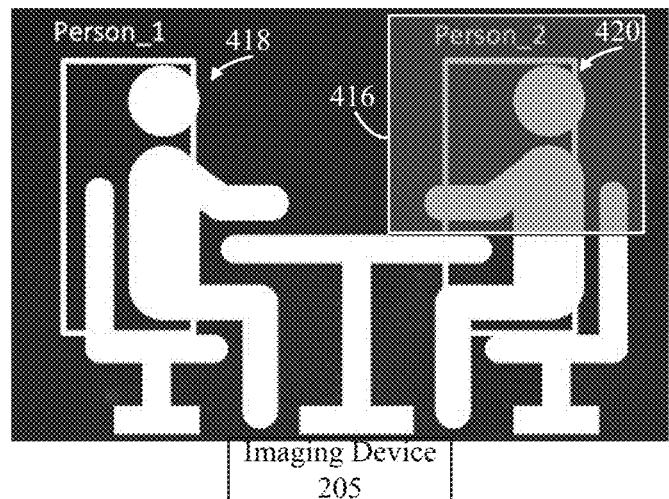
FIGS. 4C-4E illustrate a speaker frame where
Figure 4D:
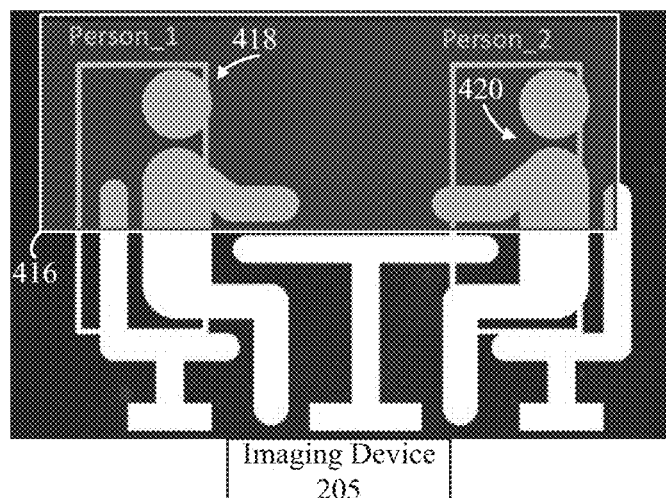
Figure 4E:
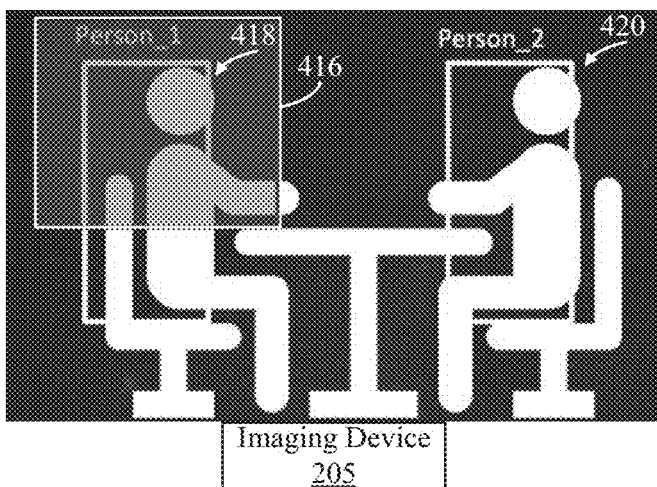

FIGS. 4C-4E illustrate speaker framing. The speaker framing focuses on conversation by framing participants actively conversing or speaking. For example, the electronic processor 212 focuses on a first speaker by displaying a panel including the first speaker in a frame. When a second speaker starts speaking, the electronic processor 212 accommodates both the speakers by adding another panel for the second speaker in the frame. When the second speaker speaks consistently for some predefined time, the electronic processor 212 focuses on the second speaker by removing a panel including the first speaker in the frame. In this way, speaking framing follows the conversation and focuses on the active speaker. In some examples, the speaker frame is a composite frame, which is dynamically generated to add and remove one or more panels in the speaker frame based on the detecting speaker(s). For example, FIG. 4C illustrates the field of view of the imaging device 205 capturing multiple potential participants and shows the speaker frame 416 including the first and second speakers 418, 420, who is speaking. In FIG. 4D, the electronic processor 212 dynamically adjust the speaker frame to add a second speaker 420. In FIG. 4E, the electronic processor 212 dynamically adjust the speaker frame to remove the first speaker 418 because the second speaker 420 speaks for more than a predetermined period of time. In some examples, the electronic processor 212 can dynamically determine the speaker frame 412 by detecting each participant 404 in each image in the video stream of images. For example, the first speaker 418 can move in the conference room. Then, the electronic processor 212 tracks the movement of the first speaker 418 and redetermine each panel corresponding to a speaker and the speaker frame 416 including all panels because the movement of the first speaker 418 changes the location of the panel to include the moved speaker. The electronic processor 212 can display the speaker frame 416 or transmit the speaker frame 416 to other conferencing system(s) for other participant(s) to display the group of participants in the other conferencing system(s).

Figure 5A:
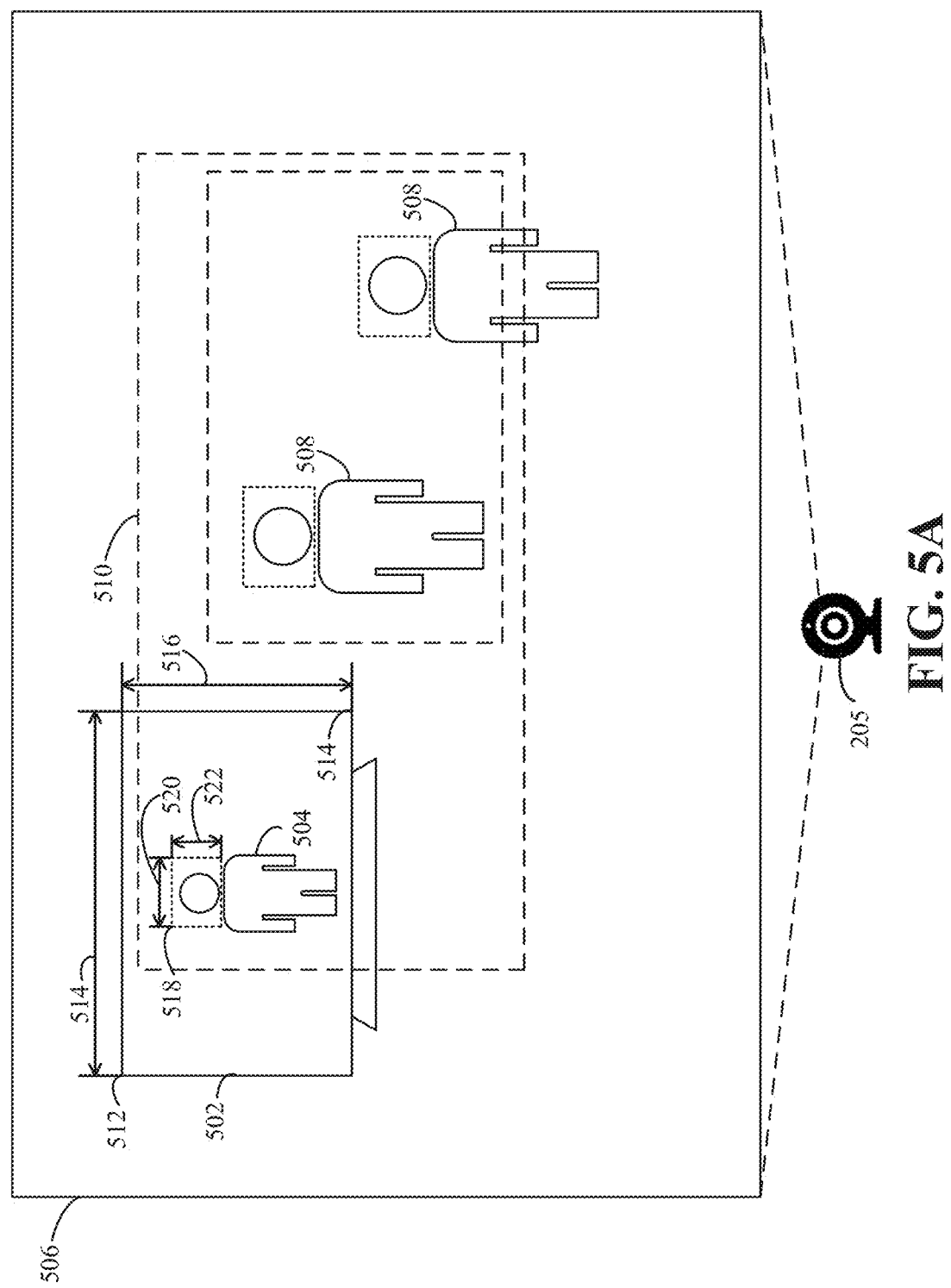
FIG. 5A illustrates a field of view of an imaging device capturing multiple potential participants including a display nonparticipant according to some examples.
Figure 5B:
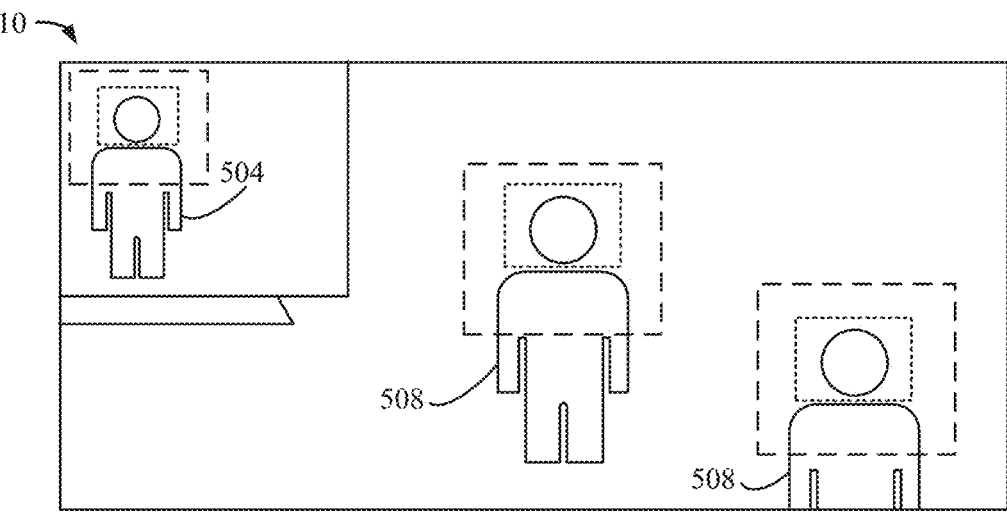
FIG. 5B is a frame to be displayed where the frame includes non-participant(s) in a display and participant(s)

FIGS. 5A-5D illustrate the identification of the display nonparticipant associated with block 315 in FIG. 3 and the rejection of the display nonparticipant in a frame associated with blocks 320 and 325 in FIG. 3. Referring to FIG. 5A, a place (e.g., a conference room or any other suitable place for a group video conference) including one or more participants in a video conference can have a display 502 (e.g., television, monitor, screen, etc.). The display may project a person 504 (i.e., the display nonparticipant). The projected person 504 can be other participant(s) on far end in the video conference, a person unrelated to the video conference, or another person. In some examples, the imaging device 205 captures a conference room including multiple potential participants. Based on the field of view of the imaging device 205, the electronic processor 212 obtains an image 506 (i.e., one or more images) of a video stream of images, as described with respect to block 305 of FIG. 3. The electronic processor 212 may detect multiple potential participants including the display nonparticipant 504 and participants 508 in the image 506 for framing, as described with respect to block 310 of FIG. 3. Thus, unless the electronic processor 212 discards the display nonparticipant 504, the electronic processor 212 may provide a frame 510 (e.g., group frame, people frame, or speaker frame) with the display nonparticipant 504, alone or with one or more of the participants 508. Referring to FIG. 5B, the frame 510 to be transmitted to other remote participant(s) on a far end includes the display nonparticipant 504 and participants 508. However, such framing ultimately results in unnecessary processing of the display nonparticipant and undesired experience for the other participants on the far end where the other participants see themselves on the display. In addition, such framing provides an undesired frame including an unwanted, undesired, and/or unnecessary imagery to other remote participants on the far end.

Referring again to FIG. 5A, the electronic processor 212 can identify the display nonparticipant 504, as an example of the identification performed in block 315 of FIG. 3. In one example, the electronic processor 212 detects the human head of each potential participant (e.g., the full head, a face, a collection of facial or head features, etc.). In some examples, the electronic processor 212 can use an artificial intelligence (AI) model to detect and locate the head of each potential participant in the field of view of the imaging device 204. In further examples, the head of each potential participant can be represented in pixel coordinate system. The detected human heads of potential participants can be kept in a data structure that holds the coordinates of each head or participant along with the detection confidence. In some examples, the data structure with n heads detected can be:

$$\begin{Bmatrix} x_1\,y_1\text{Width}_1\text{Height}_1\text{Score}_1 \\ x_2\,y_2\text{Width}_2\text{Height}_2\text{Score}_2 \\ \ldots \\ \ldots \\ x_n\,y_n\text{Width}_n\text{Height}_n\text{Score}_n \end{Bmatrix},$$

where (x, y) is a pair of pixel coordinates of the top left corner of the head bounding box, Width and Height are the width and height of the bounding box in pixel unit, and Score is the confidence of the detection from the AI model.

In some examples, the electronic processor 212 can detect the display in the field of view of the imaging device 205. In some examples, the electronic processor 212 can use another artificial intelligence (AI) model to detect the display 502 by using a bounding box surrounding the display 502 or a boundary of the display 502. Such detections can be kept in a data structure that holds the coordinates of each display along with the detection confidence. In some examples, the data structure with n displays can be:

$$\begin{Bmatrix} x_{TV1}\,y_{TV1}\text{Width}_{TV1}\text{Height}_{TV1}\text{Score}_{TV1} \\ x_{TV2}\,y_{TV2}\text{Width}_{TV2}\text{Height}_{TV2}\text{Score}_{TV2} \\ \ldots \\ \ldots \\ x_{TVn}\,y_{TVn}\text{Width}_{TVn}\text{Height}_{TVn}\text{Score}_{TVn} \end{Bmatrix},$$

where $(x_{TV}, y_{TV})$ is a pair of pixel coordinates of the top left corner of a display bounding box or a boundary of the display 502, $\text{Width}_{TV}$ and $\text{Height}_{TV}$ are width and height of the bounding box in pixel unit, and Score is the confidence of the detection from the AI model.

In further examples, the electronic processor 212 can identify whether the display 502 is activated or deactivated. In some examples, the electronic processor 212 can identify the display 502 the display being activated by analyzing the histogram of the display. For example, the histogram is largely concentrated around 0 (ZERO) values due to large number of pixels having the black color or values around the black color. When the display is activated or turned ON, the histogram is more vivid. If m displays are activated among n displays, the electronic processor 212 can perform the next step on the m number of displays (e.g., only on the m number of display).

In further examples, the electronic processor 212 can calculate the intersection of each head bounding box with each display bounding box. In some examples, the electronic processor 212 can perform the intersection calculation in response to the identification of the display being activated. In some examples, the electronic processor 212 can identify a boundary or a display bounding box of the display 502 entirely including one or more heads for corresponding potential participants. In some examples, the top left pixel of image is indexed as (0,0) and progresses as one moves right and down. The bottom right pixel is indexed as (X-1, Y-1). For each head bounding box, the electronic processor 212 identify whether it is completely inside any of the display bounding boxes by matching their (x, y) and $(x_{TV}, y_{TV})$ coordinates along with their width and height. For example, the display 512 in the image 506 has (100, 100) for the top left pixel location 512 along with the display width 514 of 200 and the display height 516 of 100 while a head bounding box of the potential participant's head has (135, 120) for the top left pixel location 518 along with the head width 520 of 15 and the head height 522 of 10. The electronic processor 212 identifies the potential participant as a nonparticipant (i.e., display nonparticipant) because the head bounding box of the potential participant 504 (i.e., width from 135 to 150 and height from 120 to 130) is entirely included in the boundary or display bounding box (i.e., width from 100 to 300 and height from 100 to 200).

Figure 5C:
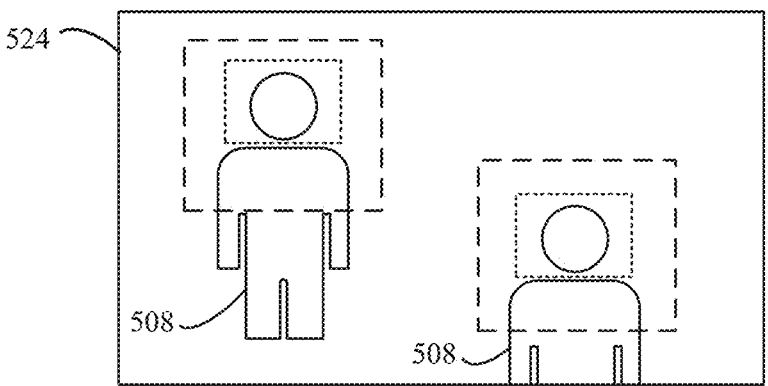
FIG. 5C is a frame with fewer or no non-participants to be displayed.
Figure 5D:
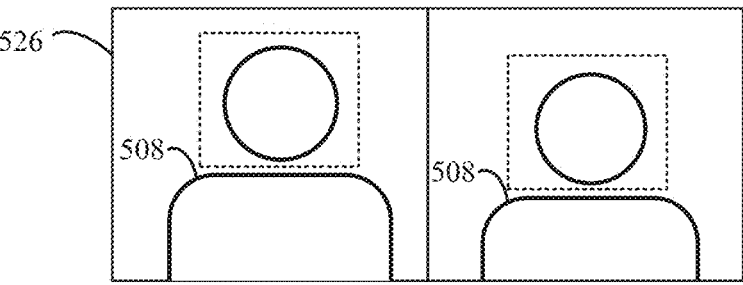
FIG. 5D is another frame with fewer or no non-participants to be displayed.

In further examples, in response to identifying the display nonparticipant 504, the electronic processor 212 can discard the display nonparticipant 504 for framing and provide a frame framing other participants 508, as discussed with respect to blocks 320 and 325 of FIG. 3. For example, to discard the display nonparticipant 504, the electronic processor 212 can exclude the display nonparticipant 504 in the frame or does not track and/or process the display nonparticipant 504 to be included in the frame. Referring to FIG. 5C, the electronic processor 212 does not process the display nonparticipant to be included in the group frame 524. In the examples, the display nonparticipant 504 can be shown in the group frame 524 when the display nonparticipant is positioned between two participants 508. However, the electronic processor 212 does not track and/process the display nonparticipant 504 to be included in the group frame 524. Referring to FIG. 5D, the electronic processor 212 can exclude the display nonparticipant from multiple potential participants for the composite frame 526 (e.g., people frame or speaker frame).

In further examples, if a head bounding box is entirely included inside one of the display bounding box that is activated, that head is flagged as 1, otherwise flagged as 0. This data structure is then communicated to the downstream application layer responsible for framing and tracking of experiences. By parsing 1/0 flags, The electronic processor 212 can decide whether the detected head is of in-room meeting participants or of far site/remote participants being projected on the display 502. The values of "1" and "0" are used as an example; in other examples, other values or flags may be used. In further examples, more than one head can be completely included inside the bounding boxes of the display. Thus, the rejection of the display nonparticipant(s) in a frame can improve experiences of users at the far end by not seeing themselves in the framing, improve experiences of users at the far end by not seeing unwanted physical spaces due to enlarged framing of people in the room and people being projected on the displays, and save processing resources and time to dynamically track and process the display nonparticipant to be included in the frame.

Figure 6A:
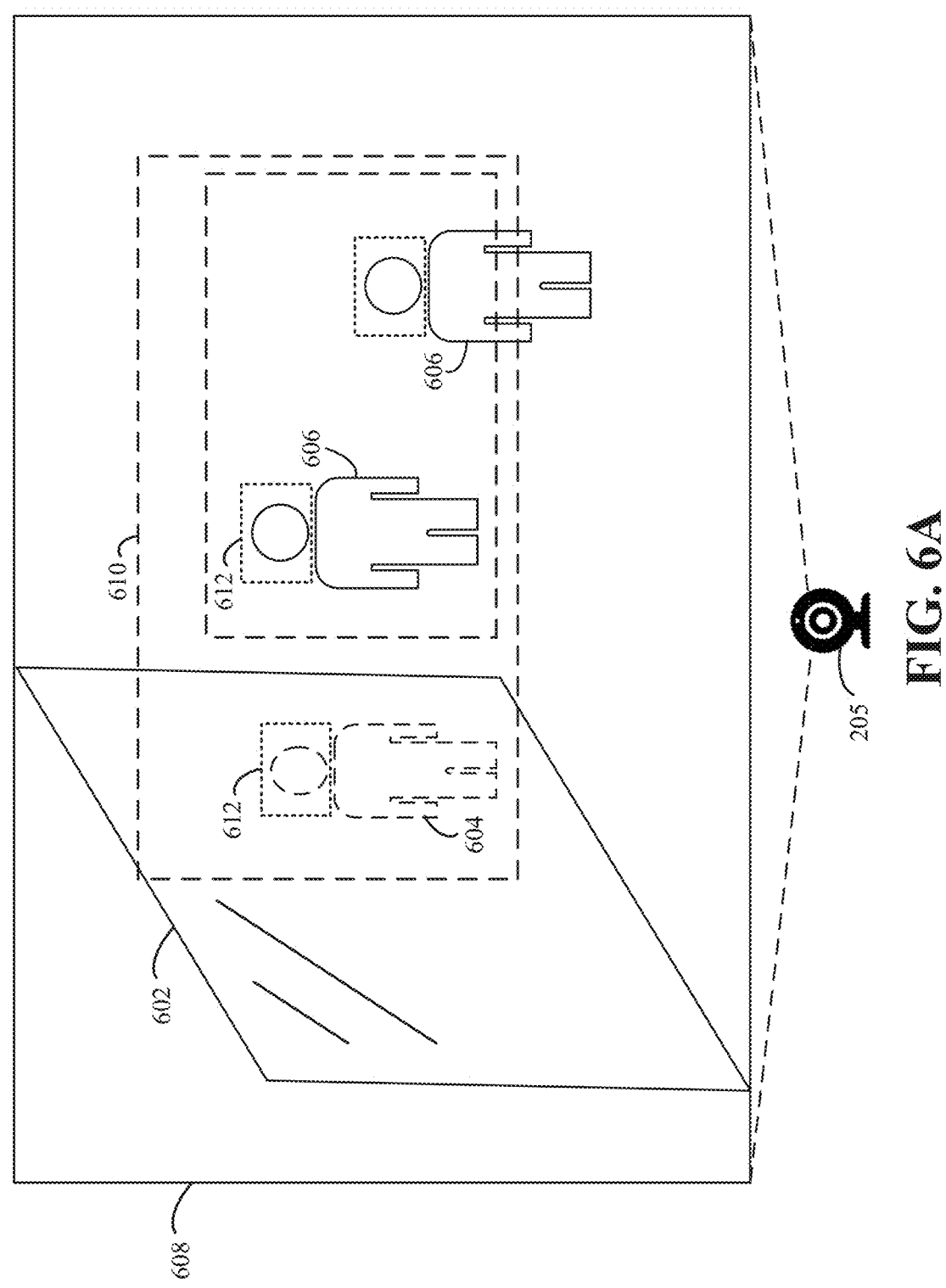
FIG. 6A illustrates a field of view of an imaging device capturing multiple potential participants including a reflected nonparticipant according to some examples.
Figure 6B:
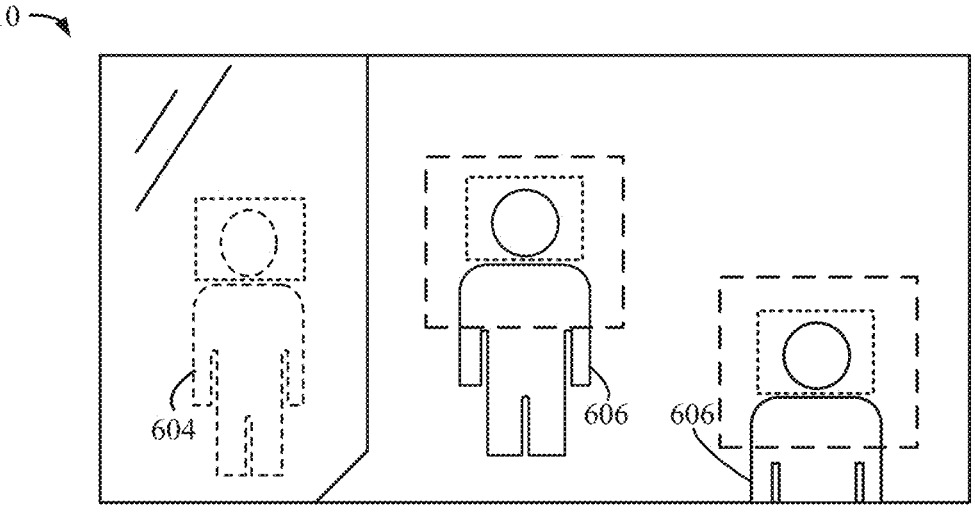
FIG. 6B is a frame to be displayed where the frame includes non-participant(s) being reflected on a reflective surface and participant(s)
Figure 6C:
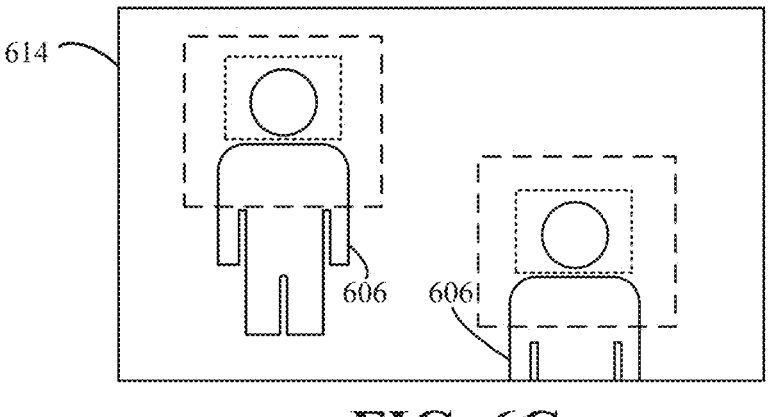
FIG. 6C is a frame with fewer or no non-participants to be displayed.

FIGS. 6A-6C illustrate the identification of the reflected nonparticipant associated with block 315 in FIG. 3 and rejection of the display nonparticipant in a frame associated with blocks 320 and 325 in FIG. 3. Referring to FIG. 6A, a place (e.g., a conference room or any other suitable place for a group video conference) including one or more participants in a video conference can have one or more reflective surfaces 602 (e.g., glass walls or other reflective objects made of glass or glass-like materials such as TV screens, monitors, portraits, reflective glossy white boards, glossy tabletops, glossy white boarding walls, or glass windows). The reflective surface 602 can show a reflected image (i.e., reflected nonparticipant 604) of one or more participants 606. In some examples, the imaging device 205 captures a conference room including multiple potential participants. Based on the field of view of the imaging device 205, the electronic processor 212 obtains an image 608 (i.e., one or more images) of a video stream of images, as described with respect to block 305 of FIG. 3. Then, the electronic processor 212 detects multiple potential participants including the reflected nonparticipant 604 and participants 606 in the image 608 for framing, as described with respect to block 310 of FIG. 3. Thus, unless the electronic processor 212 discards the reflected nonparticipant 604, the electronic processor 212 may provide a frame 610 (e.g., group frame, people frame, or speaker frame) with the reflected nonparticipant 604, alone or with one or more of the participants 606. Referring to FIG. 6B, the frame 610 to be transmitted to other remote participant(s) on a far end includes the reflected nonparticipant 604 and participants 606. However, such framing ultimately results in unnecessary processing of the reflected nonparticipant. In addition, such framing and provide an undesired frame including an unwanted, undesired, and/or unnecessary imagery to other remote participants on the far end.

Referring again to FIG. 6A, the electronic processor 212 can identify the reflected nonparticipant 604, as an example of the identification performed in block 315 of FIG. 3. In one example the electronic processor 212 can compute a score (e.g., a liveness indication or a real-person possibility score, a blurriness measure) for the participants detected in block 310 using one or more image processing algorithms (e.g., embedded algorithms). Such score is then assigned to each detected participant. The score may be a measure of liveness, sharpness, blurriness, focus measure, or another score that may be generated by using image processing algorithms or using the machine learning-based trained model (e.g., that was trained with a training set of images including real people and their reflection, which corresponding labels for the real people and reflections). Depending on the computational capability of the embedded imaging device 205, a range of methods can be adopted, evaluated, applied, optimized, and deployed to calculate this score.

In some examples, the electronic processor 212 detects the human head (e.g., the full head, a face, a collection of facial or head features, etc.) of each potential participant and generates a head bounding box 612 as described in connection with FIG. 6A. Then, the electronic processor 212 can measure and determine a liveness indication (e.g., real-person score) of the head bounding box 612. In some examples, the electronic processor 212 can determine the liveness indication (e.g., based on the variance of the Laplacian method, or another suitable technique to measure a liveness of an image). For example, the electronic processor 212 can convert the detected head bounding box 612 to a grey scale image. The electronic processor 212 can convolve the grey scale image with a predetermined kernel (e.g., the 3×3 Laplacian kernel of $$\begin{bmatrix} 0 & 1 & 0 \\ 1 & -4 & 1 \\ 0 & 1 & 0 \end{bmatrix},$$

or any other suitable kernel). The electronic processor 212 can determine a variance based on the convolved grey scale image. The variance here gives the blurriness measure that may be or indicate the liveness indication. In some examples, the variance can include a squared standard deviation. The electronic processor 212 can update the data structure associated with the head bounding box 612 to be represented as:

$$\begin{Bmatrix} x_1 y_1 \text{Width}_1 \text{Height}_1 \text{Score}_1 RP_{score_1} \\ x_2 y_2 \text{Width}_2 \text{Height}_2 \text{Score}_2 RP_{score_2} \\ \cdots \\ \cdots \\ x_n y_n \text{Width}_n \text{Height}_n \text{Score}_n RP_{score_n} \end{Bmatrix},$$

where $RP_{score_n}$ is the liveness indication of the bead bounding box n. The electronic processor 212 can compare the liveness indication of the head bounding box 612 and a predetermined liveness threshold. If the liveness indication of the head bounding box 612 falls below the predetermined liveness threshold, the electronic processor 212 determines that the potential participant is a reflected nonparticipant 604. On the other hand, if the liveness indication of the head bounding box 612 is equal to or above the predetermined liveness threshold, the electronic processor 212 determine that the potential participant is not a reflection and a participant.

In some examples, the Laplacian operator is used to measure the second derivative of an image which highlights the regions of an image containing rapid intensity changes, like Sobel operators, which is used for edge detection. If an image contains high variance, then there is a wide spread of responses, both edge-like and non-edge like, representative of a normal, in-focus image. But, if there is very low variance, then there is a tiny spread of responses, indicating there are very little edges in the image. The more an image is blurred, the less edges there are. The threshold can be domain dependent and can be programmed in the system or can have a value that is user calibrated.

Figure 6D:
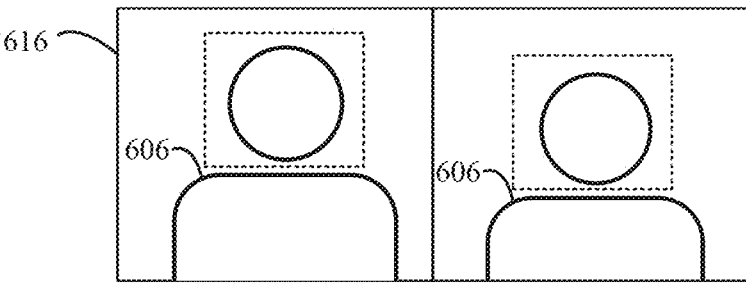
FIG. 6D is another frame with fewer or no non-participants to be displayed.

In response to identifying the reflected nonparticipant 604, the electronic processor 212 can discard the reflected nonparticipant 604 for framing and provide a frame framing other participants 616, as discussed with respect to blocks 320 and 325 of FIG. 3. The framing without the reflected nonparticipant 604 is similar to the framing without the display nonparticipant in FIGS. 5C and 5D. Referring to FIG. 6C, the electronic processor 212 can generate a group frame 614 of the image of the video stream of images and not process the reflected nonparticipant 604 to be included in the group frame 614. The group frame 614 is similar to the group frame 524 of FIG. 5C. Referring to FIG. 6D, the electronic processor 212 can generate a composite frame 616 (e.g., people frame or speaker frame) of the image of the video stream of images without the reflected nonparticipant 604 in the composite frame 616. The composite frame 616 is similar to the group frame 526 of FIG. 5D. Thus, the fewer or no non-participant framing can improve experience at the far end by not seeing peoples' reflection in the framing. Such framing can also improve experience at the far end by seeing highly stable people framing where the framing with reflections come and go, that makes very unstable experience. Such framing can also improve experience at the near end by not seeing own reflection in the frames where such frames are distracting, unwanted, unpleasant, and result in meeting uncomfortable meeting experience.

Figure 7A:
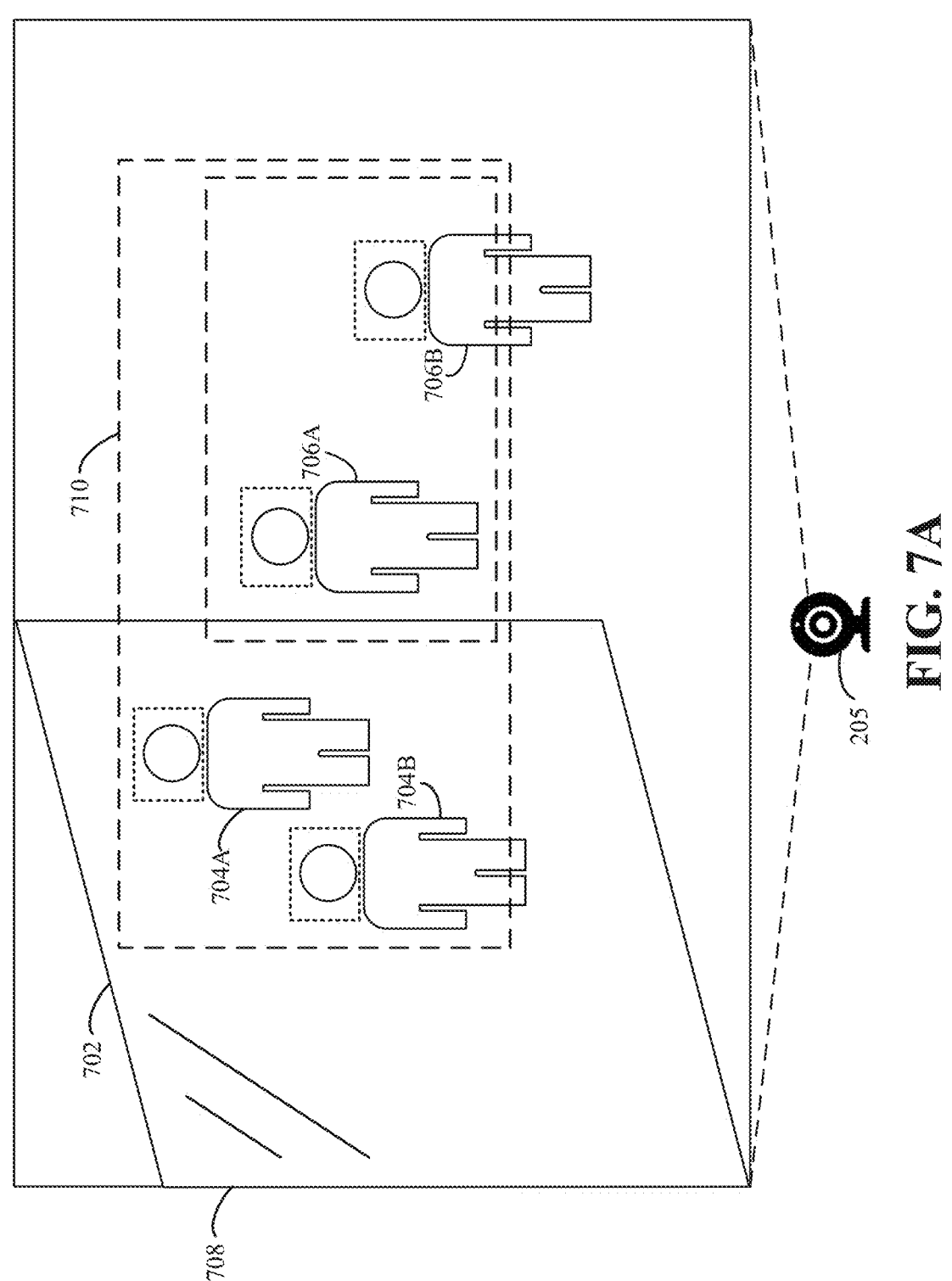
FIG. 7A illustrates a field of view of an imaging device capturing multiple potential participants including a discarding area nonparticipant according to some examples.
Figure 7B:
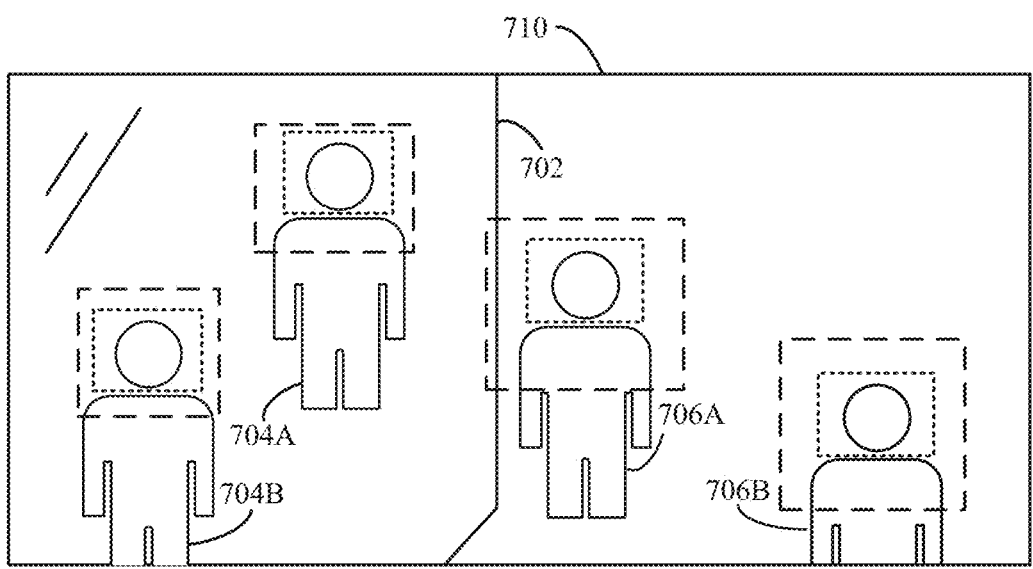
FIG. 7B is a frame to be displayed where the frame includes non-participant(s) being in a discarding area and participant(s) being in an including area.
Figure 7C:
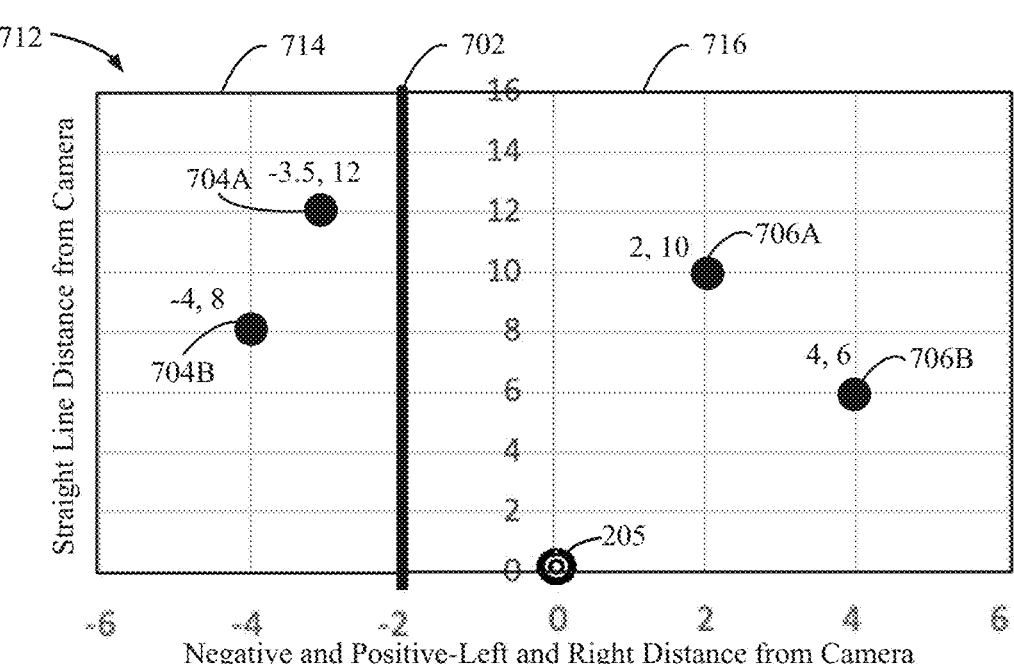
FIG. 7C is a schematic diagram showing a top view of the field of view and potential participants.
Figure 7D:
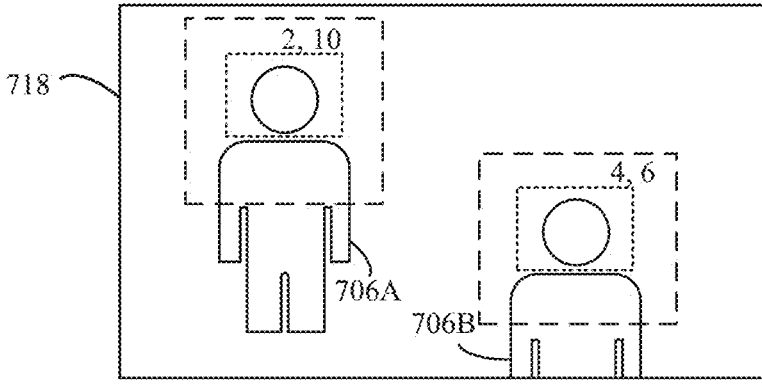
FIG. 7D is a frame with fewer or no non-participants to be displayed.

FIGS. 7A-7D illustrate the identification of the discarding area nonparticipant associated with block 315 in FIG. 3 and rejection of the discarding area nonparticipant in a frame associated with blocks 320 and 325 in FIG. 3. FIG. 7B is a frame to be displayed where the frame includes non-participant(s) being in a discarding area and participant(s) being in an including area; FIG. 7C is a schematic diagram showing a top view (i.e., bird's eye view) of the field of view and potential participants; and FIG. 7D is a frame with fewer or no non-participants to be displayed Modern hybrid workspaces are being built with glass walls. For example, conference rooms with glass walls may be used for aesthetic reasons in a workplace. However, such glass walls in a conference room pose a challenge for hybrid work collaboration using audio visual equipment of conferencing. For example, a video conferencing system may have difficulty determining or tracking what is inside and what is outside of such a conference room due to the transparent nature of glass walls and a camera's ability to see through such walls and capture images with people outside of conference rooms.

Referring to FIG. 7A, a place (e.g., a conference room or any other suitable place for a group video conference) including one or more participants in a video conference can have one or more walls 702. The wall 702 can include a transparent or translucent surface such as a glass wall or any other suitable surface which people can see through from the inside or outside of the conference room. Thus, the wall 702 allows to see one or more people (i.e., discarding area nonparticipant 704) outside of the conference room from the inside of conference room. In some examples, the imaging device 205 captures a conference room including multiple potential participants. Based on the field of view of the imaging device 205, the electronic processor 212 obtains an image 708 (i.e., one or more images) of a video stream of images, as described with respect to block 305 of FIG. 3. Then, the electronic processor 212 detects multiple potential participants including the discarding area nonparticipants 704 and participants 706 in the image 708 for framing, as described with respect to block 310 of FIG. 3. Thus, unless the electronic processor 212 discards the discarding area nonparticipant 704, the electronic processor 212 may provide a frame 710 (e.g., group frame, people frame, or speaker frame) framing the discarding area nonparticipant 704 alone or with one or more of the participants 706. Referring to FIG. 7B, the frame 710 to be transmitted to other remote participant(s) on a far end includes the reflected nonparticipant 704 and participants 706. However, such framing may ultimately result in unnecessary processing of the discarding area nonparticipant 704 and undesired experience for the other participants on the far end to see people, who are not related to the video conference, in the frame. In addition, such framing and provide an undesired frame including an unwanted, undesired, and/or unnecessary imagery to other remote participants on far end.

Referring again to FIG. 7A, the electronic processor 212 can identify the discarding area nonparticipant 704, as an example of the identification performed in block 315 of FIG. 3. In some examples, the electronic processor 212 can determine the distance of each potential participant (i.e., discarding area nonparticipant 704 or participant 706) from the imaging device 205 in horizontal and vertical direction with reference to the camera point of view and then define the position of the wall 702 in the field of view of camera to reject the people outside the glass wall (e.g., discarding area nonparticipant 704), but include people (e.g., one or more of the participants 706) inside the conference room.

In some examples, the electronic processor 212 detects the human head (e.g., the full head, a face, a collection of facial or head features, etc.) of each potential participant as described in connection with FIG. 7A. In some examples, a distance of each head from the imaging device 205 can be determined based on the center point or line of the head. For example, a first center line of $n^{th}$ detected head in pixel unit can be detected as: $H''_{center}=x+width/2$, and/or a second center line of $n^{th}$ detected head in pixel unit can be detected as: $W''_{center}=y+height/2$.

In some examples, the electronic processor 212 can determine whether people are outside or inside the conference room defined by the wall 702 by utilizing the distance (e.g., a first distance of the head on the x axis from the imaging device 205 and a second distance of the head on the y axis from the imaging device 205) of the head from the imaging device 205 in {x, y} coordinate system. The electronic processor can convert a three-dimensional space of the image into a x-y coordinate plane 712, which is the top view of the space of the image, as shown in FIG. 7C where an x-y coordinate indicates a distance from an imaging device. In some examples, the x-axis of the x-y coordinate plane 712 can indicate a horizontal distance from the imaging device 205 while the y-axis of the x-y coordinate plane 712 can indicate a vertical distance from the imaging device 205, which is parallel to the floor of the conference room. For example, if the head is located on the left of the camera center-line, the x-coordinate is a negative value, and if located on the right of the camera center-line, the x-coordinate is a positive value. In some examples, the distance of each head from the imaging device 205 can be determined in feet/meters using an AI algorithm. For example, the outcome of the head detection (e.g., using one of the above techniques) can be fed to an additional computational block that uses an AI algorithm to determine the distance of each head in the physical world from the camera in the x and y direction. In some examples, the electronic processor 212 can convert a head location in the three-dimensional space of the image into an x-y coordinate distance in the x-y coordinate plane 712 based on the size of the head and a mapping table (e.g., reverse look-up table) to extract x-y coordinates of the conference room. For example, the bigger the bounding box or a head size of a participant is, the closer the participant to the imaging device in the vertical direction or the y-axis. In further examples, although two participants are aligned in a diagonal direction in the image, the two participants can have the same horizontal distance from the imaging device 205 in the x-y coordinate plane 712. After processing through the distance estimation block, the head detection data structure can be modified to also embed the distance information with each head. The modified data structure looks like the following:

$$
\left\{
\begin{array}{c}
x_1\,y_1\,\text{Width}_1\,\text{Height}_1\,\text{Score}_1 x_{1\,physical\_room}\,y_{1\,physical\_room} \\
x_2\,y_2\,\text{Width}_2\,\text{Height}_2\,\text{Score}_2 x_{2\,physical\_room}\,y_{2\,physical\_room} \\
\cdots \\
\cdots \\
x_n\,y_n\,\text{Width}_n\,\text{Height}_n\,\text{Score}_n x_{n\,physical\_room}\,y_{n\,physical\_room}
\end{array}
\right\},
$$

where $[x_{nphysical\_room},\,y_{nphysical\_room}]$ is the distance of head$_n$ from the imaging device 205, which has the (0,0) location in the top view of the room. In some examples, the electronic processor 212 can determine the x-y coordinates shown in FIG. 7C for potential participants 704A, 704B, 706A, 706B shown in the image of FIG. 7A as: {−4, 8} for potential participant 1 (704A), {−3.5, 12} for potential participant 2 (704B), {2, 10} for potential participant 3 (706A), and {4, 6} for potential participant 4 (706B).

In some examples, the electronic processor 212 can receive a user input being indicative of a wall location of the wall 702. In some examples, the wall location can include multiple x-y coordinates for a wall location, which defines a discarding area. In some examples, the wall location can split the image or the x-y coordinate plane 712 into the discarding area and an including area. In some examples, the location of the wall 702 can be entered as start_x, start_y and end_x, end_y for each of the walls of the conference rooms, where start_x, start_y as the beginning of the wall 702 is feet/meters in x and y direction from the imaging device 205 and end_x and end_y is the end of the wall 702 from the imaging device 205. For example, {start_x, start_y, end_x, end_y}={−2, 0, −2, 16} shown in FIG. 7C means that the location of the wall 702 is 2 feet left of the imaging device 205 and starts at 0 feet depth from the imaging device 205 and ends at 16 feet depth from the imaging device 205. In these examples, a glass wall having the same start and end x-coordinates means that the glass wall is in the horizontal direction. Similarly, a glass wall having the same start and end y-coordinates means that the glass wall is in the vertical direction. However, the wall 702 can be any shape (e.g., square, rectangle, triangle, circle, oval, rhombus, polygon, etc.) to define the discarding area and can be more than one. Accordingly, in some examples, a discarding area of a conference room may include separated sub-discarding areas that collectively define the discarding area, and/or separated sub-including areas that collectively define the including area.

Once the location of the wall 702 is determined with reference to the imaging device 205, the x-y coordinate participant distance of each head is used as a threshold to determine whether the head is inside or outside the conference room. In the examples of FIG. 7C, the location of the wall 702 splits the image or the x-y plane 712 into the discarding area 714 (i.e., outside of the conference room) and the including area 716 (i.e., inside of the conference room). The electronic processor 212 can identify whether the x-y coordinate of each potential participant is included in the discarding area defined by the multiple x-y coordinates for the wall location. For example, the electronic processor 212 can identify potential participant 1 (704A) and potential participant 2 (704B) are in the discarding area 714 based on x-y coordinates for potential participant 1 (704A) and potential participant 2 (704B), which are in the discarding area 714. The electronic processor 212 can determine that potential participant 1 (704A) and potential participant 2 (704B) are the discarding area nonparticipants. In further examples, the electronic processor 212 can identify potential participant 3 (706A) and potential participant 4 (706B) are in the including area 716 based on x-y coordinates for potential participant 3 (706A) and potential participant 4 (706B), which are in the including area 714. The electronic processor 212 can determine that potential participant 3 (706A) and potential participant 4 (706B) are participants in the video conference.

Figure 7E:
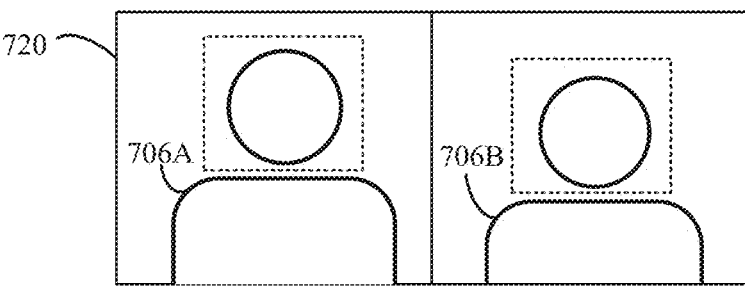
FIG. 7E is another frame with fewer or no non-participants to be displayed.

In further examples, in response to identifying the discarding area nonparticipant 704A, 704B, the electronic processor 212 can discard the discarding area nonparticipant 704A, 704B for framing and provide a frame framing other participants 706A, 706B, as discussed with respect to blocks 320 and 325 of FIG. 3. The framing without the discarding area nonparticipant 704A, 704B is similar to the framing without the display nonparticipant in FIGS. 5C and 5D. Referring to FIG. 7D, the electronic processor 212 can generate a group frame 718 of the image of the video stream of images and not process the discarding area nonparticipant 706A, 706B to be included in the group frame 718. The group frame 718 is similar to the group frame 524 of FIG. 5C. Referring to FIG. 7E, the electronic processor 212 can generate a composite frame 720 (e.g., people frame or speaker frame) of the image of the video stream of images without the discarding area nonparticipant 706A, 706B in the composite frame 720. The composite frame 720 is similar to the group frame 526 of FIG. 5D. Thus, the fewer or no non-participant framing can improve experience at the far end and not focusing on the people outside glass walls. The fewer or no non-participant framing also improves the experience at the near end by not getting disturbed with the fact the non-participants are being frame and tracked and sent to the far end.

In some examples, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, examples of the technology can be implemented as a set of instructions, tangibly embodied on a non-transitory computer-readable media, such that a processor device can implement the instructions based upon reading the instructions from the computer-readable media. Some examples of the technology can include (or utilize) a control device such as, e.g., an automation device, a special purpose or general-purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

Certain operations of methods according to the technology, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular examples of the technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "one of," "only one of," or "exactly one of."

Although the present technology has been described by referring to preferred examples, workers skilled in the art will recognize that changes can be made in form and detail without departing from the scope of the discussion.

What is claimed is:

1. A method, comprising:
detecting, by an electronic processor upon obtaining a video stream from a camera, a plurality of potential participants in an image from the video stream;
identifying, by the electronic processor upon detecting the plurality of potential participants in the image, a nonparticipant among the plurality of potential participants based on determining, by the electronic processor upon detecting a display screen in the image, that the display screen displays the nonparticipant, wherein determining that the display screen displays the nonparticipant comprises identifying, by the electronic processor, a boundary of the display screen; and
identifying, by the electronic processor, the display screen being activated based on a histogram of pixels within the boundary of the display screen, wherein the nonparticipant is identified in response to the identifying of the display screen being activated.

2. The method of claim 1,
wherein the detecting the plurality of potential participants comprises:
detecting, by the electronic processor, a plurality of human heads corresponding to the plurality of potential participants; and
generating, by the electronic processor, a first bounding box corresponding to the nonparticipant, the first bounding box surrounding a first human head of the plurality of human heads for the nonparticipant, and
wherein the identifying of the boundary of the display screen including the nonparticipant comprises:
identifying, by the electronic processor, the boundary of the display screen entirely including the first bounding box.

3. The method of claim 1 further comprising:
determining, by the electronic processor, a liveness indication of the nonparticipant, and
wherein the identifying of the nonparticipant comprises:
identifying, by the electronic processor, the liveness indication of the nonparticipant being below a predetermined liveness threshold.

4. The method of claim 3, wherein the determining the liveness indication of the nonparticipant comprises:
converting, by the electronic processor, the nonparticipant to a grey scale image;
convolving, by the electronic processor, the grey scale image with a predetermined kernel; and
determining, by the electronic processor, a variance based on the convolved grey scale image, the variance being the liveness indication.

5. The method of claim 3, wherein the nonparticipant is a reflected image of a potential participant of the plurality of potential participants reflected on a reflective surface.

6. The method of claim 1 further comprising:
splitting the image into a discarding area and an including area based on a wall location, and wherein the identifying of the nonparticipant comprises:
identifying, by the electronic processor, the nonpartici-
pant being included in the discarding area.

7. The method of claim 6 further comprising:
receiving, by the electronic processor, a user input being
indicative of the wall location.

8. The method of claim 6 further comprising:
converting a three-dimensional space of the image into an
x-y coordinate plane, an x-y coordinate plane including
a plurality of x-y coordinates, each x-y coordinate
being indicative of a distance from an imaging device,
wherein the wall location comprises a subset of the
plurality of x-y coordinates, the subset defining the
discarding area,
wherein the method further comprises:
determining, by the electronic processor, a first x-y
coordinate of the plurality of x-y coordinates for the
nonparticipant, and
wherein the identifying of the nonparticipant being
included in the discarding area comprises:
identifying, by the electronic processor, the first x-y
coordinate being included in the discarding area.

9. The method of claim 1, wherein a frame comprises a
composite frame including a panel corresponding to another
potential participant among the plurality of potential par-
ticipants and excluding the nonparticipant.

10. The method of claim 1,
wherein a frame comprises a group frame including
another potential participant, and
wherein the nonparticipant is not processed to be included
in the group frame.

11. The method of claim 1, further comprising:
discarding, by the electronic processor, the nonparticipant
from the plurality of potential participants prior to
framing the plurality of potential participants.

12. The method of claim 1, further comprising:
determining, within the image by the electronic processor,
that the nonparticipant is located outside a defined
spatial boundary within a field of view of the camera;
and
identifying, by the electronic processor upon detecting the
plurality of potential participants in the image, the
nonparticipant among the plurality of potential partici-
pants based on the determining that the nonparticipant
is located outside the defined spatial boundary within
the field of view of the camera.

13. The method of claim 12, further comprising:
determining, within the image by the electronic processor,
that liveness of the nonparticipant is below a predeter-
mined threshold, and
identifying, by the electronic processor upon detecting the
plurality of potential participants in the image, the
nonparticipant among the plurality of potential partici-
pants based on the determining that the liveness of the
nonparticipant is below the predetermined threshold.

14. A system, comprising:
an imaging device;
a memory; and
an electronic processor coupled to the memory,
wherein the electronic processor is to:
detect, upon obtaining a video stream from the imaging
device, a plurality of potential participants in an
image from the imaging device; and
identify, upon detecting the plurality of potential par-
ticipants in the image, a nonparticipant among the
plurality of potential participants based on determin-
ing, upon detecting a display screen in the image, that the display screen displays the nonparticipant,
wherein determining that the display screen displays
the nonparticipant comprises identifying, by the
electronic processor, a boundary of the display
screen and wherein the detecting the plurality of
potential participants comprises:
detecting, by the electronic processor, a plurality of
human heads corresponding to the plurality of
potential participants; and
generating, by the electronic processor, a first bound-
ing box corresponding to the nonparticipant, the
first bounding box surrounding a first human head
of the plurality of human heads for the nonpar-
ticipant, and wherein the identifying of the bound-
ary of the display screen including the nonpartici-
pant comprises identifying, by the electronic
processor, the boundary of the display screen
entirely including the first bounding box.

15. The system of claim 14,
wherein the electronic processor is further configured to:
determine a liveness indication of the nonparticipant,
and
wherein to identify the nonparticipant, the electronic
processor is configured to:
identify the liveness indication of the nonparticipant
being below a predetermined liveness threshold.

16. The system of claim 14,
wherein the electronic processor is further configured to:
split the image into a discarding area and a framing area
based on a wall location, and
wherein to identify the nonparticipant, the electronic
processor is configured to:
identify the nonparticipant being included in the dis-
carding area.

17. The system of claim 14, wherein the electronic
processor is further to:
determine, within the image by the electronic processor,
that the nonparticipant is located outside a defined
spatial boundary within a field of view of the imaging
device; and
identify, by the electronic processor upon detecting the
plurality of potential participants in the image, the
nonparticipant among the plurality of potential partici-
pants based on the determining that the nonparticipant
is located outside the defined spatial boundary within
the field of view of the imaging device.

18. A non-transitory computer-readable medium storing
computer-executable code, comprising code for causing a
computer to:
detect, upon obtaining a video stream from a camera, a
plurality of potential participants in an image from the
video stream; and
identify, upon detecting the plurality of potential partici-
pants in the image, a nonparticipant among the plurality
of potential participants based on determining, upon
detecting a display screen in the image, that the display
screen displays the nonparticipant, wherein determin-
ing that the display screen displays the nonparticipant
comprises identifying, a boundary of the display
screen, and wherein the detecting the plurality of poten-
tial participants comprises:
detecting a plurality of human heads corresponding to
the plurality of potential participants; and
generating a first bounding box corresponding to the
nonparticipant, the first bounding box surrounding a
first human head of the plurality of human heads for
the nonparticipant, and wherein the identifying of the boundary of the display screen including the non-participant comprises identifying the boundary of the display screen entirely including the first bounding box.

19. The non-transitory computer-readable medium of claim 18, wherein the computer-executable code further causes the computer to:

determine a liveness indication of the nonparticipant, and wherein to identify the nonparticipant, the computer-executable code causes the computer to:

identify the liveness indication of the nonparticipant being below a predetermined liveness threshold.

20. The non-transitory computer-readable medium of claim 18, wherein the computer-executable code further causes the computer to:

split the image into a discarding area and a framing area based on a wall location, and wherein to identify the nonparticipant, the computer-executable code causes the computer to:

identify the nonparticipant being included in the discarding area.

21. The non-transitory computer-readable medium of claim 18, wherein the computer-executable code further causes the computer to:

discard the nonparticipant from the plurality of potential participants prior to framing the plurality of potential participants.

22. The non-transitory computer-readable medium of claim 18, wherein the computer-executable code further causes the computer to:

determine, within the image, that the nonparticipant is located outside a defined spatial boundary within a field of view of the imaging device; and identify, upon detecting the plurality of potential participants in the image, the nonparticipant among the plurality of potential participants based on the determining that the nonparticipant is located outside the defined spatial boundary within the field of view of the imaging device.

* * * * *